(12) United States Patent
Vann

(10) Patent No.: US 8,867,679 B2
(45) Date of Patent: Oct. 21, 2014

(54) SYSTEMS AND METHODS FOR CANCELLING CROSS POLARIZATION INTERFERENCE IN WIRELESS COMMUNICATION USING POLARIZATION DIVERSITY

(75) Inventor: Emerick Vann, Dublin, CA (US)

(73) Assignee: Aviat U.S., Inc., Santa Clara, CA (US)

( * ) Notice: Subject to any disclaimer, the term of this patent is extended or adjusted under 35 U.S.C. 154(b) by 0 days.

(21) Appl. No.: 13/584,794

(22) Filed: Aug. 13, 2012

(65) Prior Publication Data

US 2013/0034196 A1 Feb. 7, 2013

Related U.S. Application Data

(63) Continuation-in-part of application No. 13/234,079, filed on Sep. 15, 2011.

(60) Provisional application No. 61/522,600, filed on Aug. 11, 2011, provisional application No. 61/387,401, filed on Sep. 28, 2010.

(51) Int. Cl.
*H04B 1/10* (2006.01)
*H04B 7/10* (2006.01)
*H04B 7/00* (2006.01)

(52) U.S. Cl.
CPC . *H04B 7/10* (2013.01); *H04B 7/002* (2013.01)
USPC .......................................... 375/350; 375/346

(58) Field of Classification Search
CPC ............................... H04B 7/0469; H04N 7/10
USPC .............. 375/350, 346; 325/304, 56
See application file for complete search history.

(56) References Cited

U.S. PATENT DOCUMENTS 4,083,009 A * 4/1978 Bickford et al. .............. 375/347
4,723,321 A 2/1988 Saleh
(Continued)

FOREIGN PATENT DOCUMENTS

EP 0902556 3/1999

OTHER PUBLICATIONS

International Application No. PCT/US2011/053024, International Search Report and Written Opinion mailed Jan. 11, 2012.

(Continued)

*Primary Examiner* — Sam K Ahn
*Assistant Examiner* — Fabricio R Murillo Garcia
(74) *Attorney, Agent, or Firm* — Sheppard, Mullin, Richter & Hampton LLP

(57) ABSTRACT

An exemplary system may comprise a first and second device and a first and second power splitter coupled to a single cable. The first device may be configured to receive a first noise signal of a first polarization, and to adaptively cancel, based on the first noise signal, first noise from the noisy signal associated with an orthogonal polarization. The second device may be configured to receive a second noise signal of a second polarization, and to adaptively cancel second noise from the noisy signal associated with an orthogonal polarization based on the second noise signal. The first power splitter may be configured to receive the first noise signal from the single cable and provide the first noise signal to the first device. The second power splitter may be configured to receive the second noise signal from the single cable and provide the second noise signal to the second device.

21 Claims, 12 Drawing Sheets

(56) References Cited

U.S. PATENT DOCUMENTS

| | | |
|---|---|---|
| 5,245,347 A | 9/1993 | Bonta et al. |
| 6,201,801 B1 | 3/2001 | Dent |
| 6,963,619 B1 * | 11/2005 | Gesbert et al. ............... 375/267 |
| 8,396,177 B1 | 3/2013 | Morris |
| 2005/0075139 A1 * | 4/2005 | Shapira .................... 455/562.1 |
| 2005/0233710 A1 | 10/2005 | Lakkis et al. |
| 2007/0116162 A1 * | 5/2007 | Eliaz et al. ................... 375/350 |
| 2008/0285675 A1 | 11/2008 | Roberts |
| 2009/0016723 A1 | 1/2009 | Taniguchi et al. |
| 2010/0188304 A1 | 7/2010 | Clymer et al. |

OTHER PUBLICATIONS

International Application No. PCT/US2012/050661, International Search Report and Written Opinion mailed Oct. 18, 2012.

* cited by examiner

SYSTEMS AND METHODS FOR CANCELLING CROSS POLARIZATION INTERFERENCE IN WIRELESS COMMUNICATION USING POLARIZATION DIVERSITY

CROSS-REFERENCE TO RELATED APPLICATIONS

This application seeks priority to U.S. Provisional Application Ser. No. 61/522,600, filed Aug. 11, 2011, entitled "Cross Pole IF Cancelling Signals Over a Single Cable" which is hereby incorporated herein; this application is also a continuation-in-part of and seeks priority to U.S. Nonprovisional Application Ser. No. 13/234,079, filed Sep. 15, 2011, entitled "Systems and Methods for Wireless Communication Using Polarization Diversity," which claims priority from U.S. Provisional Patent Application Ser. No. 61/387,401 filed Sep. 28, 2010, entitled "System and Method of Polarization Diversity for Adaptive Data Transmission in Point-to-Point Wireless Communications," which are all hereby incorporated herein.

FIELD OF THE INVENTION(S)

The present invention(s) relate to wireless communications systems, and more particularly, some embodiments relate to wireless communications systems that utilize signals having polarization diversity.

DESCRIPTION OF THE RELATED ART

Fading is a common impairment at quality and reliability of radio links between communications sites in a point-to-point wireless communications system. Fading often results from environmental anomalies (e.g., atmospheric anomalies) that affect a signal as the signal propagates from one end of a radio link to another. Fading is generally divided into two categories: non-frequency selective fading, and frequency selective fading.

Non-frequency selective fading (also referred to as power fading, attenuation fading, and flat fading) affects the amplitude of all frequencies in a radio frequency (RF) path equally and simultaneously. Fading of this type usually results in a weak, yet undistorted, signal. Common causes of non-frequency selective fading include, for example, obstructions in the RF path (e.g., trees and/or buildings), rain attenuation (for signal frequencies 10 GHz and higher), earth budging (diffraction loss caused by the earth's surface), and ducting effect (where the earth's atmosphere acts as a duct capable of trapping the signal within itself).

Frequency selective fading (also referred to as multi-path fading and dispersion fading) affects the amplitude of frequencies in a RF path differently and at different times. Frequency selective fading often results in a distorted signal.

Due to the deleterious effects of fading issues on radio links, conventional wireless communications systems typically ensure that the signal level of a radio link at least meets a sufficient margin of a signal level before the radio link is utilized for data transmission and reception. This margin of signal level, often called a fade margin, is generally defined as the margin between a typical receive signal level and a minimum receive signal level threshold. The fade margin helps determine the availability of a radio link in wireless communications systems, especially point-to-point wireless communications systems.

Some conventional wireless systems employ various methods for ensuring that the signal level is within the fade margin. These methods often achieve this by either protecting the radio frequency (RF) path between the communications sites, protecting the equipment, or both. Examples of such protective methods include: (1) spatial diversity; (2) frequency diversity; (3) using multiple antenna such as Multiple Input, Multiple Output (MIMO); (4) increasing transmit power; and (5) using protected transmitter and receivers. Unfortunately, as detailed below, each of these methods of improving wireless communications between sites suffers from one or more drawbacks.

With respect to spatial diversity, in order to achieve transmit (Tx) and receive (Rx) space diversity, two or more antennas are often required at each site. As a result, implementing spatial diversity in a wireless communications system not only increases the number of antennas used by systems (e.g., doubles the number of antennas), but also increases the system cost. Additionally, where the wireless communications system is already in use and utilizing an existing antenna tower, that antenna tower would require additional physical area to mount the additional antennas.

A drawback of frequency diversity is that additional allocation of frequency spectrum is required for the wireless system. The additional allocation both increases spectrum usage and requires additional frequency licenses (i.e., additional frequency spectrum leases). Consequently, frequency diversity reduces the efficiency of spectrum usage and increases the frequency spectrum cost for the wireless system.

With regard to MIMO systems, like spatial diversity, MIMO systems require two or more antennas to achieve transmit (Tx) and receive (Rx) space diversity. Accordingly, implementing MIMO in a wireless communications system increases the number of antennas at the communications site, increases the system cost, and requires additional physical area on antenna towers.

In order to increase the transmit power, a higher power transmitter is usually implemented at the transmitting communications site. Unfortunately, higher power transmitter are not only higher in cost than their regular counterparts, but also, due to their higher power consumption and higher temperature stress, are not as reliable as their regular counterparts. Furthermore, merely increasing the transmit power does not provide the system with the opportunity to increased data throughput.

Lastly, protected transmitters and receivers suffer from drawbacks similar to those affecting high powered transmitters. Protected transmitters and receivers have higher costs than their regular counterparts, fail to increase data capacity in the wireless system, and consume more DC power than their non-protected counterparts.

SUMMARY OF EMBODIMENTS

According to various embodiments, systems and methods are provided that improve signal quality and signal reliability over short and long-distance wireless communication using polarization diversity. In particular, some embodiments use polarization diversity on a wireless channel to address and compensate for fading conditions on a wireless channel, such as non-frequency selective fading (also referred to as power fading, attenuation fading, and flat fading) and frequency selective fading (also referred to as multipath fading and dispersive fading). For example, some embodiments utilize a horizontal signal and a vertical signal on the same wireless channel when wirelessly communicating data between a transmitter and a receiver to address a fading condition over a wireless channel.

By utilizing polarization diversity, various embodiments are able to provide improved wireless communication availability and reliability without the need for: (1) adding extra antennas; (2) obtaining and using additional frequency spectrums; and (3) using increased power amplifiers. Consequently, in addition to improving the wireless communication, some embodiments do so: (a) at a lower cost (e.g., no additionally antennas make it easier to implement); (b) while improving communication availability over longer distance; and (c) while improving frequency spectrum reuse and efficiency. Additionally, as described herein, in situations where the condition of the wireless channel is experiencing no fading condition, some embodiment can increase the data rate (i.e., data throughput) over a wireless channel.

It should be noted that, throughout this document, signals embodying polarization diversity with respect to one another are often referred to herein as "polarization-diverse signals." For example, a vertically polarized signal and a horizontally polarized signal are considered polarization-diverse signals and may be referred to as such. The same is true for a clockwise circularly polarized signal and a counterclockwise circularly polarized signal.

Depending on the embodiment, the polarization diversity of the signals may be such that the polarized-diverse signals are not correlated with respect to one another, or are less correlated with respect to one another. Usually, when the polarization-diverse signals are not correlated or less correlated, when one of the polarization-diverse signals is being affected by a fading condition on the wireless channel, the other is less affected (or remains completely unaffected) by the same fading condition. For example, where an embodiment is using a horizontally polarized signal and a vertically polarized signal on a wireless channel, the two polarization-diverse signals have different qualities that cause them to be affected differently by a given fading condition over a given wireless channel.

Accordingly, some embodiments are able to utilize the unique behavior of polarization-diverse signal under fading conditions to implement data transmission redundancy over a wireless channel. For example, in some embodiments, each of the polarization-diverse signals carries the same data so that even when a wireless channel is experiencing a fading condition, at least one of the polarization-diverse signals (the one that is less affected or unaffected by the fading condition) can reach its destination (i.e., receiver) with the data intact.

Then, as noted herein, when a wireless channel is not experiencing a fading condition, some embodiments are able to utilize polarization diversity to provide increased (e.g., double) data transmission. For example, in some embodiments, each of the polarization-diverse signals may be configured to carry a different portion of a data stream to its destination when the wireless channel is without a fading condition. Because all of the transmitted polarization-diverse signals usually reach their destination in absence of fading conditions, when the signals reach their destination they have effectively increased data throughput over using just one signal to deliver the data.

Accordingly, in some embodiments, the data is adaptively split and combined according to a fading condition of the wireless channel. For instance, where an embodiment detects a fading condition on the wireless channel, the polarization-diverse signals carry the same data, thereby ensuring that the data is reaches its destination by at least one signal, regardless of existence of fading conditions. Then, when the same embodiment detects a fading condition on the wireless channel is not present, the data is split amongst the polarization-diverse signals such that they carry different data, thereby increasing the amount of data being conveyed over the wireless channel.

In some embodiments, when the polarization-diverse signals are intended to carry different data (to increase data throughput), the different data originates from a single data stream that is split into two or more data streams according to one or more criteria. For example, a single data stream may be split according to data block size (either variable or predefined size), data type, or priority of the data.

In some embodiments, other methodologies for increasing quality and reliability of communication over a wireless channel may also be utilized in conjunction with polarization diversity. For example, some embodiments may utilize adaptive modulation in conjunction with the polarization diversity to improve wireless communication. Under adaptive modulation, the digital or analog modulation scheme of the polarization-diverse signals is adaptively adjusted (i.e., both on the transmitter side and the receiver side) based on the presence or absence of a fading condition on the wireless channel. Depending on the embodiment, the digital/analog modulation adjustment may be applied uniformly across all the polarization-diverse signals (e.g., by both the vertically polarized signal and the horizontally polarized signal), or differently for each polarization-diverse signal. For instance, where an embodiment is using 256 QAM (quadrature-amplitude modulation) for both polarized signal and the horizontally polarized signal, the adaptive modulation may cause the embodiment to change one or both polarization-diverse signals to a 64 PSK (phase-shift key) modulation when the channel condition warrants such a change (e.g., fading condition has increased such that both polarization-diverse signals are adversely effected).

In some embodiments, another methodology for increasing quality and reliability of communication over a wireless channel includes using a digital signal processor to further reduce the correlation between the polarization-diverse signals.

As described herein, various embodiments may be implemented using a variety of components including, but limited to: transmitters, receivers, transceivers, transducers, antennas, modulators, demodulators, splitters, combiners, digital signal processors (DSPs), controllers, modems, or some combination or variation thereof. For some embodiments, the features described herein are being implemented in a wireless point-to-point communications system, where the wireless channel is part of a point-to-point link between two communications sites. For instance, some embodiments may be implemented as a split-mount system comprising an antenna capable of transmitting or receiving two polarizations, an outdoor-unit (ODU), and an indoor-unit (IDU). While the ODU may comprise a transmitter, receiver, or transceiver, and a transducer, the IDU may comprise a DSP, a combiner or splitter, a modem, and a controller.

In various embodiments, a transmitter/receiver pair facilitates communication between two sites over a single wireless channel, where the transmitting site comprises a transmitter configured to send data over the single wireless channel using polarization-diverse signals, and where the receiving site comprises a receiver configured to receive data over the single wireless channel via the polarization-diverse signals. The transmitter at the transmitting site, the receiver at the receiving site, or both may be part of a transceiver at that site. Additionally, for some embodiments, multiple transmitter/receiver pairs may be utilized between two communications sites to provide and establish multiple wireless channels between the two sites, with each transmitter/receiver pair facilitating a single wireless channel, and each wireless channel carrying a separate set of polarization-diverse signals.

In some embodiments, the features described herein can be implemented into existing point-to-point wireless systems by way of replacement or upgrade of certain components. For example, some embodiments may be implemented into existing wireless communications systems by merely updating or upgrading the ODU, IDU, or antenna of the system in order to implement features and functionality described herein.

According to various embodiments, various steps described above are implemented using a computer. For example, some embodiments may provide for a computer program product comprising a computer useable medium having computer program code embodied therein for controlling a wireless communications system in accordance with aspects of various embodiments described herein.

According to various embodiments, systems and methods are provided for improving signal quality and signal reliability over wireless communication using polarization diversity.

An exemplary system may comprise a first device, a second device, a single cable, a first power splitter, and a second power splitter. The first device may be configured to process a noisy signal based on a vertically polarized signal from an antenna, to receive a first noise signal based on a horizontally polarized signal, and to adaptively cancel first noise from the signal based on the noisy vertically polarized signal, the adaptive cancellation being based on the first noise signal to generate a first clean signal. The second device may be configured to process a noisy signal based on the horizontally polarized signal from the antenna, to receive a second noise signal based on the vertically polarized signal, and to adaptively cancel second noise from the signal based on the noisy horizontally polarized signal, the adaptive cancellation being based on the second noise signal to generate a second clean signal. The first power splitter may be coupled to the first device and the single cable. The first power splitter may be configured to receive the first noise signal from the single cable, to provide the first noise signal to the first device, to receive the second noise signal from the first device, and to provide the second noise signal to the single cable. The second power splitter may be coupled to the second device and the single cable. The second power splitter may be configured to receive the second noise signal from the single cable, to provide the second noise signal to the second device, and to provide the first noise signal from the second device to the single cable.

The first power splitter may provide the first noise signal to the first device over a first port. Further, the first power splitter may receive the second noise signal from the first device over a second port. The first port of the first power splitter being at least partially isolated from the second port. The first and second power splitters may be reactive power splitters. The first and second devices may be receivers.

In some embodiments, adaptively cancelling first noise from the noisy signal based on the vertically polarized signal comprises equalizing the noisy signal based on the vertically polarized signal, the equalization being based at least partially on the first noise signal to attenuate at least some of the first noise. In various embodiments, adaptively cancelling first noise from the noisy signal based on the vertically polarized signal comprises attenuating at least some of the first noise based at least partially on the first noise signal.

The first and second noise may be caused by cross polarization interference. In some embodiments, the first noise signal based on the horizontally polarized signal and the second noise signal based on the vertically horizontally polarized signal comprises the first noise signal being based on the first clean signal and the second noise signal being based on the second clean signal.

The system may further comprise a combiner configured to receive the first clean signal from the first device and the second clean signal from the second device and generate a combined signal based on the first and second clean signals.

In some embodiments, the system may further comprise an orthogonal transducer configured to receive the vertically polarized signal and the horizontally polarized signal from the antenna, to provide the noisy signal based on the vertically polarized signal to the first device, and to provide the noisy signal based on the vertically polarized signal to the second device. Further, a waveguide filter may be configured to filter the vertically polarized signal and the horizontally polarized signal from the antenna and provide the filtered vertically polarized signal and the horizontally polarized signal to the orthogonal transducer.

A method may comprise receiving, by a first device, a noisy signal based on a vertically polarize signal, receiving, by the first device, a first noise signal based on a horizontally polarized signal, adaptively cancelling, by the first device, first noise from the noisy signal based on the vertically polarized signal, the adaptive cancellation being based on the first noise signal to generate a first clean signal, receiving, by the second device, a noisy signal based on the horizontally polarized signal, receiving, by the second device, a second noise signal based on the vertically polarized signal, adaptively cancelling second noise from the noisy signal based on the horizontally polarized signal, the adaptive cancellation being based on the second noise signal to generate a second clean signal, receiving, by a first power splitter, the first noise signal from a single cable, providing, by the first power splitter, the first noise signal to the first device, receiving, by the first power splitter, the second noise signal from the first device, providing, by the first power splitter, the second noise signal to the single cable, receiving, by a second power splitter, the second noise signal from a single cable, providing, by the second power splitter, the second noise signal to the second device, receiving, by the second power splitter, the first noise signal from the second device, and providing, by the second power splitter, the first noise signal to the single cable.

An exemplary system comprises a first and second device, a first and second means, and a single cable. The first device may be configured to process a noisy signal based on a vertically polarized signal from an antenna, to receive a first noise signal based on a horizontally polarized signal, and to adaptively cancel first noise from the signal based on the noisy vertically polarized signal, the adaptive cancellation being based on the first noise signal to generate a first clean signal. The second device may be configured to process a noisy signal based on the horizontally polarized signal from the antenna, to receive a second noise signal based on the vertically polarized signal, and to adaptively cancel second noise from the signal based on the noisy horizontally polarized signal, the adaptive cancellation being based on the second noise signal to generate a second clean signal. The first means may be for receiving the first noise signal from the single cable, providing the first noise signal to the first device, receiving the second noise signal from the first device, and providing the second noise signal to the single cable. The second means may be for receiving the second noise signal from the single cable, providing the second noise signal to the second device, and providing the first noise signal from the second device to the single cable.

Other features and aspects of various embodiments will become apparent from the following detailed description, taken in conjunction with the accompanying drawings, which illustrate, by way of example, the features in accordance with some embodiments. The summary is not intended to limit the scope of embodiments, which is defined solely by the claims attached hereto.

BRIEF DESCRIPTION OF THE DRAWINGS

The drawings are provided for purposes of illustration only and merely depict typical or example embodiments. These drawings are provided to facilitate the reader's understanding and shall not be considered limiting of the breadth, scope, or applicability various embodiments.

The figures are not intended to be exhaustive or to limit the embodiments to the precise form disclosed. It should be understood that various embodiments may be practiced with modification and alteration.

DETAILED DESCRIPTION OF THE EMBODIMENTS

Embodiments are directed toward systems and methods for wireless communications using polarization diversity. As described herein, various embodiments provide systems and methods that use polarization diversity on a wireless channel to address and compensate for fading conditions. Some embodiments, for example, utilize a horizontal signal and a vertical signal on the same wireless channel to redundantly communicate data between communications sites when the same wireless channel is experiencing a fading condition. By redundantly communicating data between communications sites, such embodiments make available a communications link (i.e., radio link comprising a wireless channel) that would otherwise be unavailable due to fading conditions.

Figure 1:
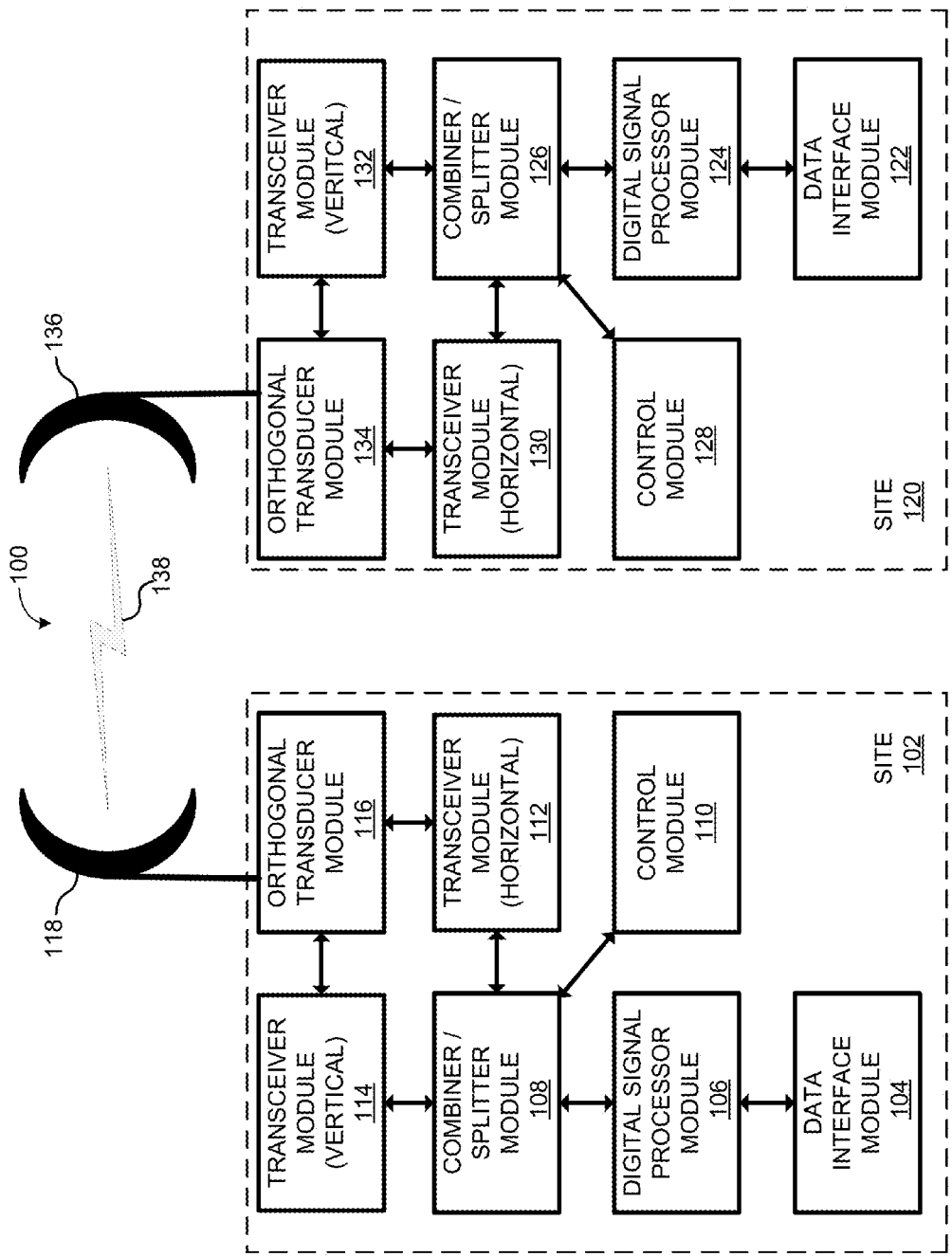
FIG. 1 is a block diagram illustrating an example of a wireless communications system in accordance with some embodiments.

FIG. 1 is a block diagram illustrating an example of a wireless communications system 100, in accordance with some embodiments. The illustrated wireless communications system 100 comprises a wireless communications site 102 and a wireless communications site 120. Both wireless communications sites 102 and 120 include: data interface modules 104 and 122, a digital signal processor module 106 and 124, a combiner/splitter module 108 and 126, a control module 110 and 128, a transceiver module that handles the horizontally polarized signal 112 and 130, a transceiver module that handles the vertically polarized signal 114 and 132, a orthogonal transducer module 116 and 134, and antennas 118 and 136. The communications link 138 between the two sites represents the radio frequency (RF) path between site 102 and site 120, over which data is transmitted and received between the two sites.

In wireless communications system 100, the data interface modules 104 and 122 are coupled to the digital signal processor modules 106 and 124, and represent a data source or data sink for their respective communications site. The data interface modules 104 and 122 are configured to provide data intended for wireless transmission over the communications link 138, receive data that has been wirelessly transmitted over communications link 138, or both. Generally, data to be transmitted by one communications site to the another is first provided to the digital signal processor module 106 or 124 for processing by their respective data interface module 104 or 122. Conversely, data that has been received by one communications site from another may be processed by the digital signal processor module 106 or 124 and then provided to the data interface module 104 or 122. Depending on the embodiment, the data interface module 104 or 122 may be coupled to a data network or to a digital device, such as the digital device 800 illustrated in FIG. 8.

The digital signal processor modules 106 and 124 are respectively coupled to the data interface modules 104 and 122, and respectively coupled to the combiner/splitter modules 108 and 126. The digital signal processor modules 104 and 122 are responsible for processing data received from their respective data interface modules 104 or 122, and for processing data streams from their respective combiner/splitter module 108 and 126. In some embodiments, when a wireless communications site is wirelessly transmitting data, a digital signal processor module 106 or 124 receives data from its respective data interface module 104 or 122, processes the data, and provides a corresponding data stream to its respective combiner/splitter module 108 or 126. Conversely, when the wireless communications site 102 or 120 is receiving wirelessly transmitting data, in some embodiments, the digital signal processor module 106 or 124 receives a data stream from its respective combiner/splitter module 108 or 126, processes the data stream, and provides corresponding data to its respective data interface module 104 or 122.

Those skilled in the art will appreciate and understand that the data stream received by the digital signal processor module 106 or 124 may be in the form of binary data or an analog signal. The digital stream may comprise I-Q data (i.e., in-phase data and quadrature-phase data) in binary form or as analog signals. As such, in some embodiments, where the combiner/splitter module 108 or 126 operates in the analog domain (e.g., the module splits or combines based on the analog level), the data stream provided by the digital signal processor module 106 or 124 may appropriately be an analog signal. Alternatively, in some embodiments, where the combiner/splitter module 108 or 126 operates in the digital domain (e.g., the module splits or combines based on the bit level), the data stream generated by the digital signal processor module 106 or 124 may appropriately be a binary data stream.

The digital signal processor module 106 or 124 may comprise a digital signal processor, a digital-to-analog converter, an analog-to-digital converter, or some combinations or variations thereof The digital signal processor module 106 or 124 may be configured to process data for a number of purposes including, for example, conversion of data (e.g., converting between data and I-Q data), data compression, error correction, processing to further reduce of correlation between the polarization-diverse signals, filtering, and measuring data signals. For example, by processing the data stream received from the combiner/splitter 108 or 126, the digital signal processor module 106 or 124 may measure, or assist in the measurement, of the overall strength of a signal stream received by the antenna 118 or 136. Additionally, based on wireless channel conditions, the digital signal processor module 106 or 124 may be utilized to: determine whether an power adjustment is warranted for one or more of the polarization-diverse signals being transmitted (e.g., increase power of the vertically or horizontally polarized signal); determine whether more data should be diverted to one polarization-diverse signal over another; determine whether one of the polarization-diverse signals should be disabled; or assist in adaptive modulation process (e.g., help determine the best modulation for a transceiver module).

As described herein, in some embodiments, measurement of signal strength may be used to determine whether a received signal meets a minimum receive signal level threshold. From this determination, a receiving communications site may determine whether the wireless channel on which a signal is received is experiencing a fading condition, and may inform the transmitting communications site accordingly. To address the fading condition, the transmitting communications site may transmit data such that polarization-diverse signals carry redundant data, thereby increasing the likelihood that data transmitted is successfully received by the receiving communications site. Depending on the embodiment, the transmitting communications site may transmit data redundantly when instructed to do so by the receiving communications site, or based on the transmitting communications site's own determination.

For some embodiments, information regarding wireless channel conditions is shared between the communications sites 102 and 120 in the form of channel state information (CSI), which may be transmitted by a communications site 102 to its counterpart communications site 120 on a periodic basis. In addition to sharing the measured strength of the signal received (e.g., as a received signal strength indicator [RSSI]), communications sites 102 and 120 may gather and share other information regarding observed conditions, such as signal-to-noise (SNR) ratio over the wireless channel and telemetry data.

Continuing with FIG. 1, each of the combiner/splitter modules 108 and 126 is coupled to the digital signal process module 106 or 124, a transceiver module that handles the horizontally polarized signal 112 or 130, and a transceiver module that handles the vertically polarized signal 114 or 132. Each of the combiner/splitter modules 108 and 126 is also coupled to a control module 110 or 128, which is responsible for controlling the combiner/splitter module 108 or 126 in accordance with features of an embodiment. As noted herein, the combiner/splitter modules 108 and 126 are configured to divide or combine an original data stream based on the current conditions of a wireless channel between sites 102 and 120.

Those of ordinary skill in the art would appreciate that in some embodiments, a the combiner/splitter modules 108 and 126 may be replaced by a router module that routes signals to a passive splitter module and a passive combiner module. For example, in some embodiments, the passive combiner module may comprise a passive concatenator, and a passive redundancy comparator. In some embodiments, the router module may be controlled by the control modules 110 or 128.

In some embodiments, when a wireless channel being utilized between two communications sites 102 and 120 is experiencing a fading condition, the transmitting communications site may configure itself to transmit redundant data on polarization-diverse signals in order to address the fading condition. For instance, the combiner/splitter module 108 for the transmitting communications site 102 may be instructed (e.g., by its respective control module 110) to generate a first data stream and a second data stream from the original data stream received by the digital signal processor module 106. Each of the first and second data streams may be redundantly identical to each other. Subsequently, each of the first and second data streams may be provided by the combiner/splitter module 108 to the transceiver modules 112 and 114—(e.g., one data stream going to a transceiver module (horizontal) 112, and the other data stream going to the transceiver (vertical) 114).

The receiving communications site 120 may be configured to receive redundant data on the polarization-diverse signals in order to address the fading condition. For example, the combiner/splitter module 126 may be instructed (e.g., by the control module 128) to combine a first data stream and a second data stream received from the transmitting site 102 to create a single data stream, where the first and second data streams are assumed to be redundantly identical to the single data stream. Each of the first and second data streams are received by the combiner/splitter module 126 from its pair of transceiver modules—one data stream from the transceiver (horizontal) module 130, and the other data stream from the transceiver (vertical) module 132.

For some embodiments, when the wireless channel being utilized is no longer experiencing a fading condition, the transmitting communications site may configure itself to divide the original data stream into two or more data streams such that each of the data streams contains a different portion of the original data stream, and to transmit those two or more streams using the polarization-diverse signals such that each polarization-diverse signal carries different data. In order to receive the data, the receiving communications site may configure itself accordingly to combine the data streams extracted from received polarization-diverse signals, and create a single data stream.

For instance, the combiner/splitter module 108 for the transmitting communications site 102 may be instructed (by its respective control module 128) to split a first data stream and a second data stream from the original data stream, each of the first and second data streams containing mutually exclusive portions of data from the original data stream. Subsequently, each of the first and second data streams may be provided by the combiner/splitter module 108 to the pair of transceiver modules 112 and 116—one data stream going to a transceiver (horizontal) module 112, and the other data stream going to a transceiver (vertical) module 114. Depending on the embodiment, the splitting process may divide the original data stream based on a number of criteria including, for example, data type, data block size, and priority of data.

Conversely, the receiving communications site 120 may configure itself to receive different data on each of the polarization-diverse signals. For example, the combiner/splitter module 126 may be instructed to concatenate portions of a first data stream received with portions of a second data stream received in order to create a single data stream comprising data from the transmitting communications site 102.

For some embodiments, when the wireless channel lacks a fading condition, the transmitting and receiving communications sites configure themselves to operate as a Cross Polarization Interference Cancellation (XPIC) wireless system, which may appropriately double the data bandwidth over a wireless channel using polarization-diverse signals.

The transceiver modules 112, 114, 130, and 132 are coupled to their respective combiner/splitter modules 108 or 126 and orthogonal transducer modules 116 or 134. Depending on the embodiment, the transceiver modules may comprise a digital signal processor that is different and separate from the digital signal processor of the digital signal processor module 106 or 124. As described herein, the transmitting communications site 102 may have a pair of transceiver modules such that one transceiver module 112 handles the radio frequency (RF) path of the horizontally-polarized signal, and the other transceiver module 114 handles the radio frequency (RF) path of the vertically-polarized signal. Similarly, the receiving communications sites 120 may have a pair of transceiver modules such that one transceiver module 130 handles the radio frequency (RF) path of the horizontally-polarized signal, and the other transceiver module 132 handles the radio frequency (RF) path of the vertically-polarized signal.

When communications site 102 is transmitting data to site 120, each of its transceiver modules 112 and 114 receives a different data stream from the combiner/splitter module 108, modulates the data stream onto a carrier signal having the center frequency of the wireless channel to be utilized, and provides via the orthogonal transducer module 116. Then, when the communications site 120 is receiving data from site 102, each of its transceiver modules 130 and 132 receives a different carrier signal from the orthogonal transducer module 134, demodulates the carrier signal to extract a data stream from the carrier signal, and provides that data stream to the combiner/splitter module 126. Those skilled in the art would appreciate that the communications sites 102 and 120 may switch roles and continue to operate in a similar manner.

The transceiver modules 112 and 114 may also modulate the data stream onto the carrier signal using a variety of data modulation schemes including, but not limited to, quadrature-amplitude modulation (QAM), phase-shift keying (PSK), frequency-shift keying (FSK), trellis coded modulation (TCM), and variations thereof Additionally, for some embodiments, the transceiver modules 112 and 114 may further implement adaptive modulation schemes configured to adjust the data modulation of the data stream onto the carrier signals based on the conditions of the wireless channel. For example, when the wireless channel conditions between two communications sites change such that they adversely affect the vertically-polarized signal traveling over the wireless channel but not the horizontally-polarized signal, the transmitting communications site may adjust the data modulation of the carrier signal for the vertically-polarized signal from 256 QAM to 16 QAM. This change may be applied uniformly to the horizontally-polarized signal as well, or may be isolated to just the vertically-polarized signal. In some embodiments, the modulation change implemented by the adaptive modulation may be uniform across all carrier signals provided by the combiner/splitter module 108, and not just isolated to the polarization-diverse signal that is adversely affected by the wireless channel conditions. Additionally, in various embodiments, the determination or activation of an alternative modulation at the transmitting communications site 102 may be determined remotely by the receiving communications site 120, which then instructs the transmitting communications site 102 of its determination.

As described herein, each of the orthogonal transducer modules 116 and 134 is coupled to an antenna 118 or 136 and a pair of transceiver modules 112 and 114, or 130 and 132, respectively. One transceiver 112 of the pair may be coupled to the horizontal polarization port of the orthogonal transducer module 116, and the other transceiver 114 may be coupled to the vertical polarization port of its orthogonal transducer module 116.

When the communications site 102 is transmitting data, the orthogonal transducer module 116 receives modulated carrier signals from its respective transceiver modules 112 and 114, polarizes the modulated carrier signals according to the port designations (i.e., vertical polarization, and horizontal polarization), and provides the resulting polarized signals through the respective antenna 118. Conversely, when the communications site 120 is receiving data, the orthogonal transducer module 134 receives polarized-diverse signals from the antenna 136 (i.e., a vertical polarization signal and a horizontal polarization signal), and depolarizes the polarized-diverse signals, which results in a modulated carrier signal for each polarized-diverse signal. These modulated carrier signals may be subsequently provided to transceiver modules 132 and 134 via ports that correspond to different polarized-diverse signals (e.g., the modulated carrier signal from the vertically polarized signal is provided to the transceiver 132 coupled to the vertical polarization port).

The antennas 118 and 136 are coupled to their respective orthogonal transducer module 116 or 134, and are configured to either transmit orthogonally-polarized signals, receive orthogonally-polarized signals, or both, over the communications link 138. For some embodiments, the antennas 118 and 136 are dual-polarization antennas that are directed at each other, and possibly have line-of-sight with respect to one another.

It should be noted that in some embodiments, the original data stream may be split such that the first data stream and the second data stream contain some of the same data and some different data. In doing so, some embodiments are able to provide a mix of redundancy and throughput over the polarization-diverse signals transmitted.

One of ordinary skill in the art would readily understand that where some embodiments implement point-to-point wireless communications (e.g., microwave/millimeter frequency communications system), bi-directional data transfer between two communications site (e.g., site 102 and site 120) may be facilitated using two or more separate wireless channels between the sites. Each wireless channel may have a different center frequency and carrying its own set of polarization-diverse signals. For example, in the context of wireless communications system 100, a point-to-point wireless communications system may require one wireless channel to transmit data from site 102 to site 120, and require another wireless channel (i.e., having a different centery frequency) to transmit data from site 120 to site 102. In some embodiments, where more than one wireless channel is used to transmit data to a wireless communications site (or more than one wireless channel is used to receive data from a wireless communications site), each transmit or receive wireless channel may be facilitated by a set of transceivers (one for each polarization-diverse signal being transmitted) at the transmitting site, and a set of transceivers (one for each polarization-diverse signal being received at the receiving site).

While the wireless communications system 100 is illustrated as it is, one of ordinary skill in the art would understand and appreciate that alternative components, configurations, and functions may be utilized when implementing various embodiments. For instance, where wireless communications system 100 communicates data in only one direction (e.g., from site 102 to site 120), the transceivers of transmitting site (e.g., site 102) may be replaced with transmitters, the transceivers of the receiving site (e.g., site 120) may be replaced with receivers (thereby allowing the site to only receive data), the combiner/splitter of the transmitting site (e.g., site 102) may be replaced with a splitter, and the combiner/splitter of the receiving site (e.g., site 120) may be replaced with a combiner. In another example, the functions of the digital signal processor module, the combiner/splitter module, and the pair of transceivers modules at a single communications site may be implemented as one or more modules.

Additionally, those skilled in the art will appreciate that various embodiments can be readily implemented in connection with a variety of other configurations, depending on the particular wireless system being implemented. For example, while some of the embodiments herein are described in the context of a general wireless communications system, it should be understood that other embodiments may be implemented in most any microwave/millimeter wave frequency wireless system, including split-mount systems, indoor-only systems, and systems where the signal processing and radio processing are in one unit.

Figure 2:
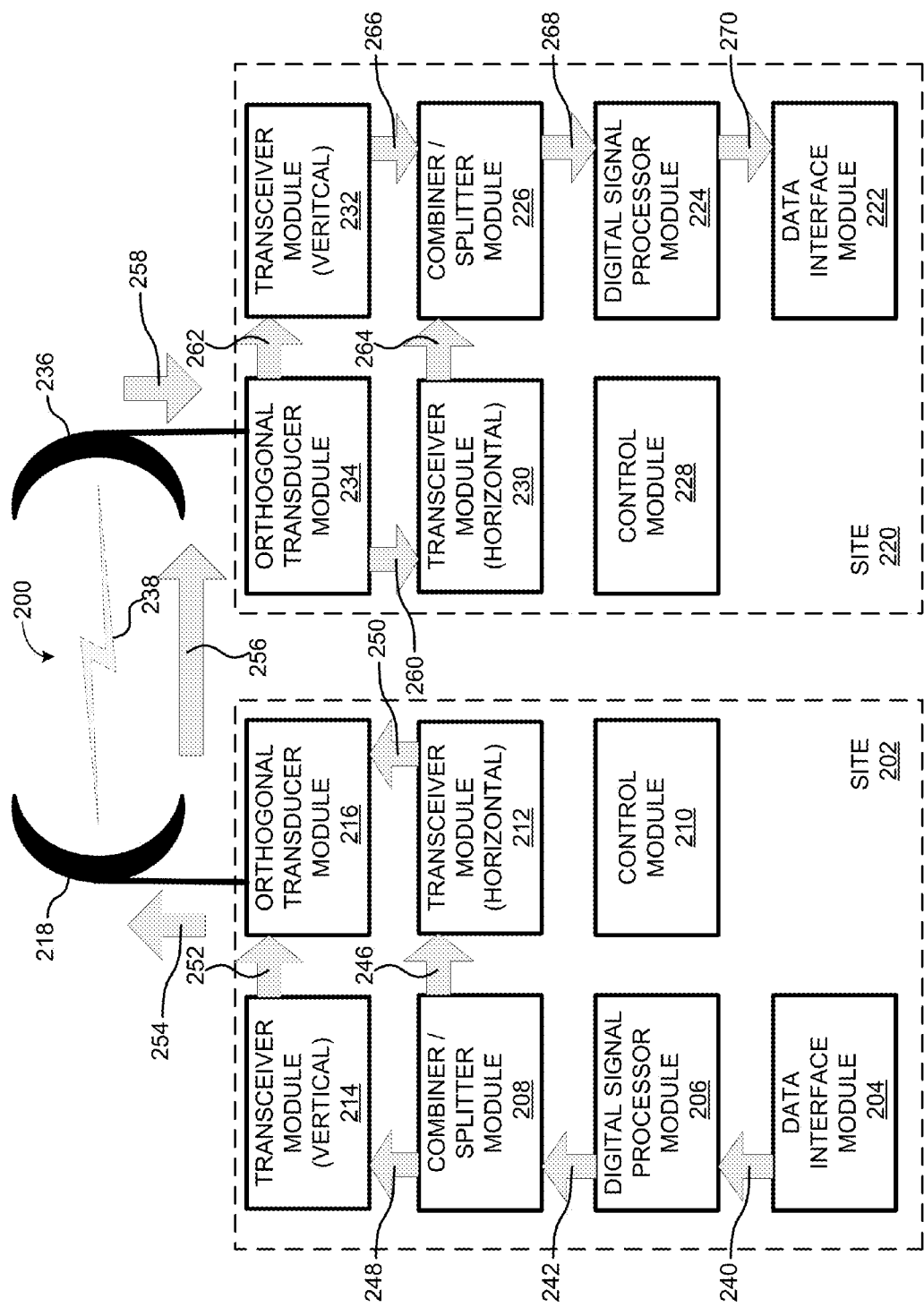
FIG. 2 is a block diagram illustrating information flow in an example of a wireless communications system in accordance with some embodiments.

FIG. 2 is a block diagram illustrating information flow in an example of a wireless communications system 200 in accordance with some embodiments. FIG. 2 illustrates how data flow in wireless system 200 when data is being transmitted from wireless communications site 202 to wireless communications site 220. As shown, the flow of information begins at wireless communications site 202, when the data interface module 204 provides the digital signal processor module 206 with data 240 to be transmitted. The digital signal processor module 206, in turn, processes the data 240 received and provides a data stream 242 to the combiner/splitter 208.

The combiner/splitter module 208 splits the data 242 into two data streams; one data stream 248 is intended for the vertical polarization RF path and the other data stream 246 is intended for the horizontal polarization RF path. As noted herein, the combiner/splitter module 208 may divide the two data streams in accordance with multiple conditions, including the present condition of the wireless channel being utilized between site 202 and site 220. Information regarding the condition of the wireless channel may be obtained from a number of sources including, but not limited to, channel condition information received from the receiving communications site (e.g., site 220), and channel condition information gathered by the transmitting communications site (e.g., site 202) when the transmitting communications site last functioned as a receiving communications site.

The transceiver module 212 receives the first data stream 246 from the combiner/splitter module 208, and the transceiver module 214 receives the second data stream 248 from the combiner/splitter module 208. Each of the transceiver modules 212 and 214 may modulate their respective data stream onto a carrier signal having a center frequency of the wireless channel to be utilized. The resulting modulated carrier signals 250 and 252, respectively, may be provided to the orthogonal transducer module 216. The transceiver module 212 may provide the modulated carrier signal 250 to the horizontal port of the orthogonal transducer module 216. Likewise, the transceiver module 214 may provide the modulated carrier signal 252 to the vertical port of the orthogonal transducer module 216.

The orthogonal transducer module 216 may horizontally polarize the modulated carrier signal 250 from the transceiver module 212, vertically polarize the modulated carrier signal 252 from the transceiver module 214, and provide both polarized signals 254 to the antenna 218 for transmission. The (vertically and horizontally) polarized signals 256 are transmitted over the communications link 238, from antenna 218 to antenna 236. The communications link 238 may comprise the wireless channel having the center frequency of the polarized carrier signals.

Upon receiving the polarized signals, the antenna 236 at wireless communications site 220 may provide the polarized signals 258 to the orthogonal transducer module 234. The orthogonal transducer module 234 may depolarize the polarized signals 258 to produce the modulated carrier signals 260 and 262. The modulated carrier signal 260 produced by depolarizing the received horizontally polarized signal may be provided to the transceiver module 230 handling the horizontal polarization RF path. Similarly, the modulated carrier signal 262 produced by depolarizing the received vertically polarized signal may be provided to the transceiver module 232 handling the vertical polarization RF path.

The transceiver module 230 may demodulate the modulated carrier signal 260, and provides the resulting data stream 264 to the combiner/splitter module 226. Likewise, the transceiver module 232 may demodulate the modulated carrier signal 262 received from the orthogonal transducer module 234, and provides the resulting data stream 266 to the combiner/splitter module 226. The combiner/splitter module 226, in turn, may combine or concatenate the two data streams 264 and 266 to create a single data stream 268. For some embodiments, the combiner/splitter module 226 combines or concatenates the two data streams based on how the combiner/splitter module 208 at site 202 generated data streams from the original stream. Additionally, the combiner/splitter module 226 may perform operations in accordance with instructions provided by the control module 210.

The combiner/splitter module 226 provides the resulting single data stream 268 to the digital signal processor 224. Subsequent to processing the single data stream, the digital signal processor 224 provides resulting data 270 to the data interface module 222.

Figure 3:
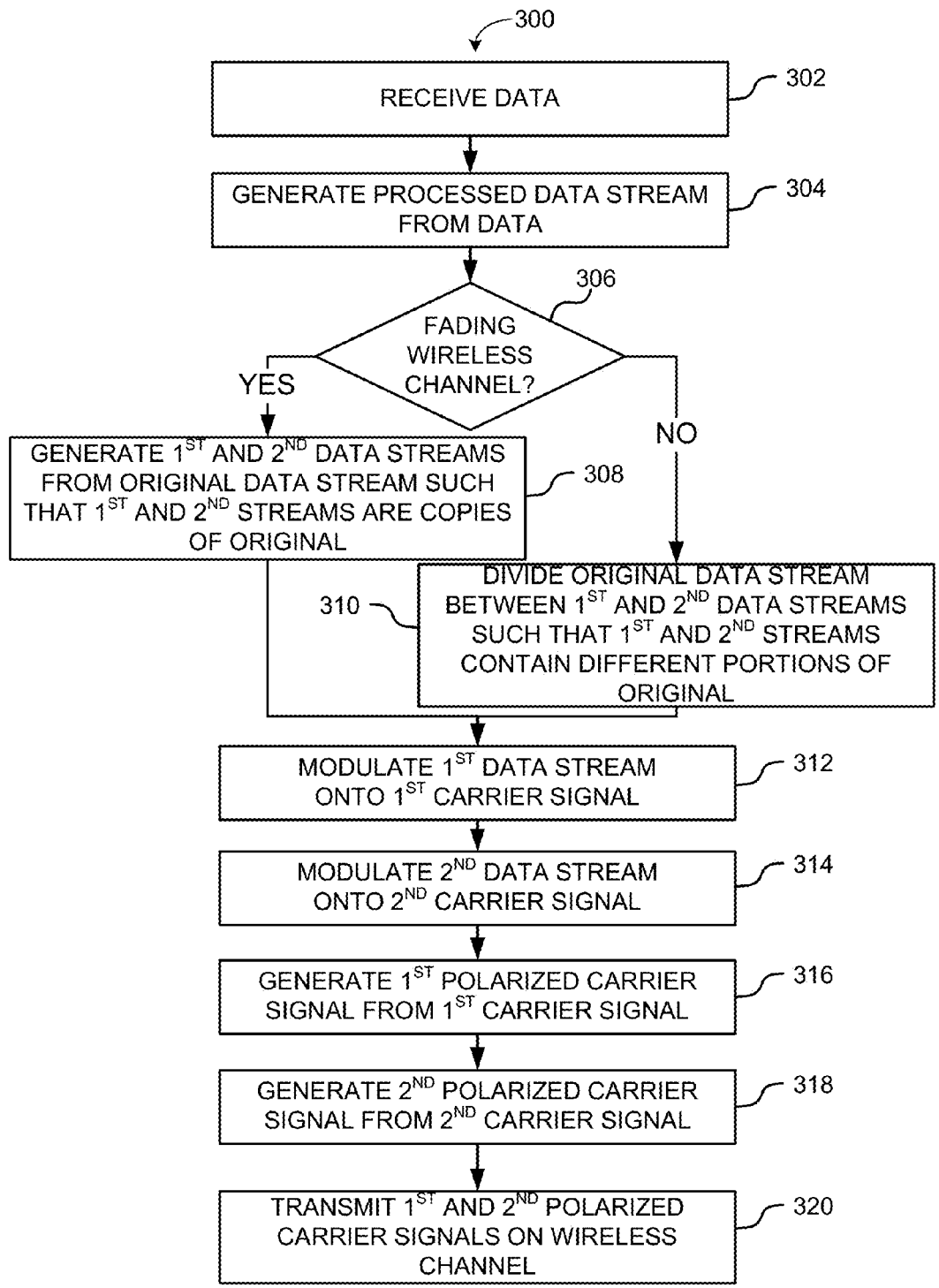
FIG. 3 is a flowchart illustrating an example of a method for transmitting data in accordance with some embodiments.

FIG. 3 is a flowchart illustrating an example of a method 300 for transmitting data in accordance with some embodiments. Method 300 begins at step 302 by receiving data intended for transmission. In some embodiments the source data may be received by a data interface module 204 from a data network (e.g., modem) or a digital device.

In step 304, a processed data stream is generated from the data received at step 302, where the generated processed data stream corresponds to the data received. Depending on the embodiment, the processed data stream may be generated by a digital signal processor module 206, and the processed data stream may be in the form of binary data or an analog signal.

In step 306, a determination is made whether the wireless channel to be used in transmission of the data is experiencing a fading condition (i.e., the wireless channel is a fading wireless channel). In some embodiments, a control module at the transmitting communications site may make this determination based on number of factors including, without limitation, information shared between the communications sites regarding the condition of the wireless channel to be used for data transmission (e.g., RSSI, CSI), and information shared between the communications sites regarding the condition of other wireless channels in use between the communications sites.

If, in step 306, it is determined that the wireless channel to be used in transmission of the data is experiencing a fading condition, at step 308 the transmitting communications site may generate a first data stream and a second data stream from a higher priority data stream, each of which may be redundantly identical to the higher priority data stream and/or each other. For some embodiments, step 306 entails: using a combiner/splitter module 208 at the transmitting communications site to generate a first data stream and a second data stream from the higher priority data stream, where each of the first and second data streams are redundantly identical to each other and to the higher priority data stream, and providing each of the first and second data streams to separate transceivers 212 and 214.

Those skilled in the art will appreciate the differentiation of the data stream under fading condition from the data stream in a non-fading environment. Under the fading condition, the capacity of the higher priority data stream may be approximately 50% of the original data stream since the first data stream and the second data stream may be redundantly identical.

If, in step 306, it is determined that the wireless channel to be used in transmission of the data is not experiencing a fading condition, at step 310 the transmitting communications site may divide the original data stream into a first data stream and a second data stream, each of which contains a different portion of data of the original data stream. For some embodiments, step 308 entails: using a combiner/splitter module 208 at the transmitting communications site to generate a first data stream and a second data stream from the original data stream such that the original data stream is split amongst the first and second data streams, each of the first and second data streams contains mutually exclusive portions of the original data stream, and portions of the first and portions of the second data streams can be concatenated together by the receiving communications site to create a single data stream. Subsequently, each of the first and second data streams may be provided by the combiner/splitter module 208 to separate transceivers 212 and 214.

It also should be noted that in some embodiments, where a data stream generated during step 304 is in the form of binary data, the data streams generated at steps 308 or 310 may be in the form of binary data, and where a data stream generated during step 304 is in the form of an analog signal, the data streams generated at steps 308 or 310 may be in the form of an analog signal.

Subsequently, in step 312, the first data stream is modulated onto a first carrier signal, and in step 314, the second data stream is modulated onto a second carrier signal. Depending on the embodiment, steps 312 and 314 may be performed in any order (e.g., sequentially), or concurrently. The first and second carrier signals utilized may have the center frequency of the wireless channel. Additionally, in some embodiments, modulating the first and second data streams onto the first and second carrier signals, respectively, involves applying a digital modulation scheme. Examples of digital modulation schemes that may be used include, without limitaiton, QAM, PSK, FSK, and TCM.

For some embodiments, the modulation of the data streams onto carrier signals entails the use of a transceiver module 212 or 214 or transmitter module for each polarization-diverse signal to be transmitted to the receiving communications site. Accordingly, in the case of method 300, some embodiments utilize two transceiver modules 212 and 214 or transmitter modules to modulate the first and second data streams onto the first and second carrier signals (one module for the horizontally polarized signal to be transmitted to the receiving communications site, and another module for the vertically polarized signal to be transmitted to the receiving communications site).

In step 316, a first polarized carrier signal is generated from the first carrier signal, and in step 318, a second polarized carrier signal is generated from the second carrier signal. Generally, the first and second polarized carrier signals have the center frequency of the wireless channel to be used during data transmission. In some embodiments, the first polarized carrier signal is a horizontally polarized signal, while the second polarized carrier signal is a vertically polarized signal. Additionally, the first and second polarized signals may be generated using an orthogonal-mode transducer module 216 having one port to receive a first carrier signal, and another port to receive a second carrier signal.

Once the polarized signals are generated, in step 320, the first and second polarized carrier signals are transmitted over the wireless channel to a remote antenna at a receiving communications site. In some embodiments, the first and second polarized carrier signals are transmitted using an antenna 218 capable of transmitting polarization-diverse signals, either simultaneously or sequentially.

Figure 4:
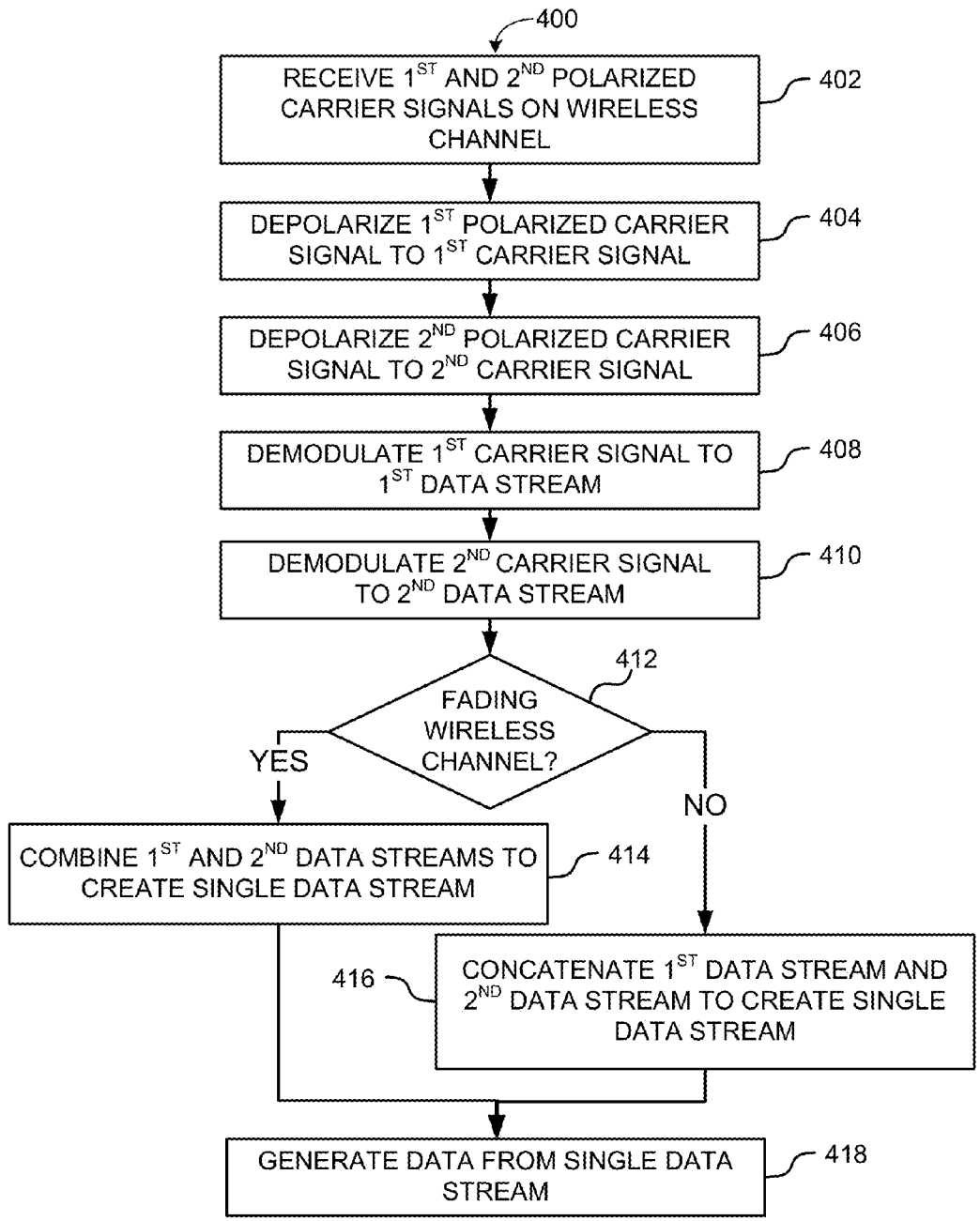
FIG. 4 is a flowchart illustrating an example of a method for receiving data in accordance with some embodiments.

FIG. 4 is a flowchart illustrating an example of a method for receiving data in accordance with some embodiments. Turning now to FIG. 4, the method 400 begins at step 402 by receiving a first polarized carrier signal and a second polarized carrier signal from a remote antenna at a transmitting communication site. Generally, the first and second polarized carrier signals have the center frequency of the wireless channel being used to receive data. For some embodiments, the first and second polarized carrier signals are received using an antenna 236 capable of receiving polarization-diverse signals, either simultaneously or sequentially. In some embodiments, the first polarized carrier signal is a horizontally polarized signal, while the second polarized carrier signal is a vertically polarized signal.

In step 404, the first polarized carrier signal is depolarized to a first carrier signal, and in step 406, the second polarized carrier signal is depolarized to a second carrier signal. In some embodiments, a orthogonal transducer module 234 performs the depolarization steps (e.g., sequentially or concurrently) upon receiving the first and second polarized carrier signals from an antenna 236. Subsequently, the resulting first and second carrier signals may be provided to transceivers 230 and 232 through designated ports of the orthogonal transducer module 234.

In some embodiments, the first and second carrier signals that result from the depolarization steps are modulated to carry a data stream. Where such is the case, in step 408 the first carrier signal is demodulated to extract a first data stream from the first carrier signal, and in step 410, the second carrier signal is demodulated to extract a second data stream from the second carrier signal. The steps 408 and 410 may be performed in any order (e.g., sequentially), or concurrently. Usually, the first and second carrier signals utilized have the center frequency of the wireless channel being used to receive data. For some embodiments, the first and second carrier signals are modulated using a digital modulation scheme and, as such, must be demodulated according to such scheme in order to extract the first and second data streams from the first and second carrier signals. Examples of digital modulation schemes that may be used include, but are not limited to, QAM, PSK, FSK, and TCM.

For some embodiments, the demodulation of the carrier signals to extract data streams entails the use of a transceiver module 230 or 232 or receiver module for each polarization-diverse signal received from the transmitting communications site. In one example, two transceiver modules 212 and 214, or receiver modules, are utilized to demodulate the carrier signals to data streams—one module to demodulate the carrier signal originating from the received horizontally polarized signal, and the other module to demodulate the carrier signal originating from the received vertically polarized signal.

In step 412, a determinate is made whether the wireless channel to be used in transmission of the data is experiencing a fading condition (i.e., the wireless channel is a fading wireless channel). This determination may be based on number of factors including, without limitation, information shared between the communications sites regarding the condition of the wireless channel to be used for data transmission (e.g., RSSI, CSI), and information shared between the communications sites regarding the condition of other wireless channels in use between the communications sites.

If, in step 412, it is determined that the wireless channel to be used in transmission of the data is experiencing a fading condition, at step 414 the transmitting communications site may combine the first data stream and the second data stream to create a single data stream, where each of the first and second data streams are redundantly identical to each other and the single data stream. For some embodiments, step 412 entails: using a combiner/splitter module 226 at the receiving communications site to combine the first data stream and the second data stream to create the single data stream; and providing the created single data stream to a digital signal processor module 224 for further processing.

If, in step 412, it is determined that the wireless channel to be used in transmission of the data is not experiencing a fading condition, at step 416 the receiving communications site may concatenate portions of the first data stream with portions of the second data stream to create a single data stream. For some embodiments, step 416 entails: using a combiner/splitter module 226 at the receiving communications site to concatenate portions of the first data stream with portions of the second data stream to create the single data stream; and providing the created the single data stream to a digital signal processor module 224 for further processing.

Depending on the embodiment, the data stream may be in the form of binary data or an analog signal. For instance, where a combiner/splitter module 226 operates in the analog domain, the data stream generated would be an analog signal, and where a combiner/splitter module operates in the digital domain, the data stream generated would be a binary data stream.

In step 418, data is generated from the single data stream, where the data corresponds to the single data stream created. For some embodiments, the data may be generated using a digital signal processor module 224, which may subsequently provide the resulting data to a data network or digital device through a data interface module 222.

Figure 5:
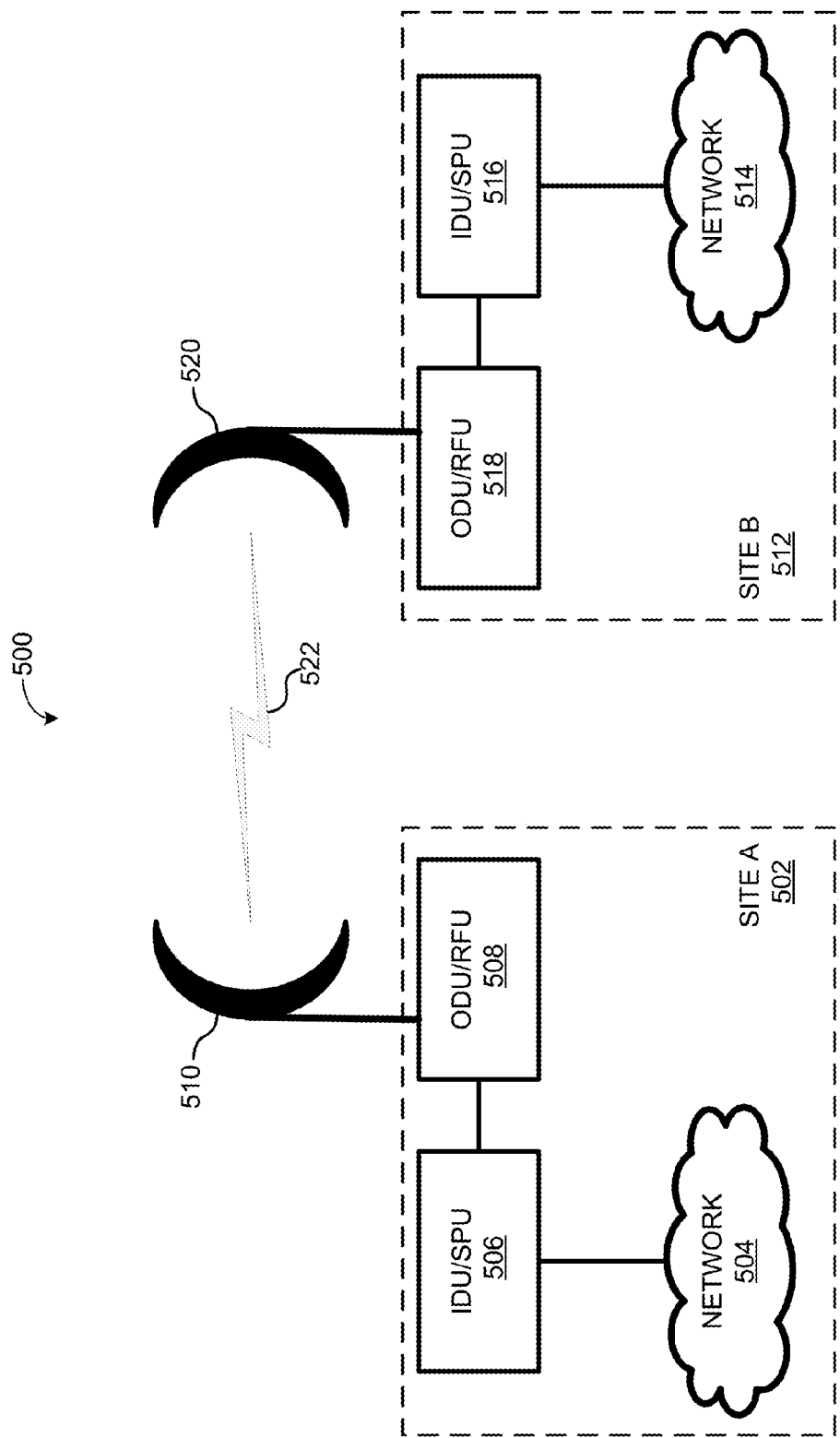
FIG. 5 is a block diagram illustrating an example of a microwave wireless communications system in accordance with some embodiments.

FIG. 5 is a block diagram illustrating an example of a microwave wireless communications system 500 in accordance with some embodiments. The example microwave communications system 500 is a split-mount wireless system comprising indoor units (IDU)/signal processing units (SPU) 506 and 516, outdoor units (ODU)/radio frequency units (RFU) 508 and 518, and antennas 510 and 520 at each of two communications sites 502 and 512. As shown, the microwave wireless communications system 500 facilitates communications between the network 504 at site 502 and the network 514 at site 512.

The IDU/SPUs 506 and 516 may function as the signal processing units (SPU) for the microwave communications system 500. Generally, locating the signal processing equipment in the IDU/SPU helps minimize the amount of equipment that has to be located in the ODU/RFUs 508 and 518, which is usually closer to the antennas 510 and 520. For some embodiments, each of the IDU/SPUs 506 and 516 comprises a digital signal processor module, a combiner/splitter module, a modem module, a power supply modules, and possibly auxiliary components/modules (e.g., for redundancy).

As illustrated, the IDU/SPUs 506 and 516 are coupled to the ODU/RFUs 508 and 518. The ODU/RFUs may function as the radio frequency units (RFU) for the microwave communications system 500 and, as such, may include the intermediate frequency (IF) and radio frequency (RF) equipment needed to transmit and receive wireless signals over a wireless channel. For example, in some embodiments, each of the ODU/RFUs 508 and 518 comprises two or more transceivers modules, and a transducer module that connects to the antenna (510 and 520). Generally, the ODU/RFUs 508 and 518 are responsible for converting the data stream (e.g., binary data or analog signal) from the IDU/SPUs 506 and 516 into corresponding wireless signal(s) to be transmitted via the antennas 510 and 520, and converting wireless signal(s) received via the antennas 510 and 520 into a corresponding data stream (e.g., binary data or analog signal) to be processed by the IDU/SPUs 506 and 516. As noted herein, the antennas 510 and 520 may be configured to transmit and receive wireless signals.

While the embodiments describe in FIG. 5 are described in the context of a microwave transmission system, some embodiments may be implemented in other wireless communications system, including indoor-only systems, and cellular phone systems, WiFi systems, and the like.

Figure 6:
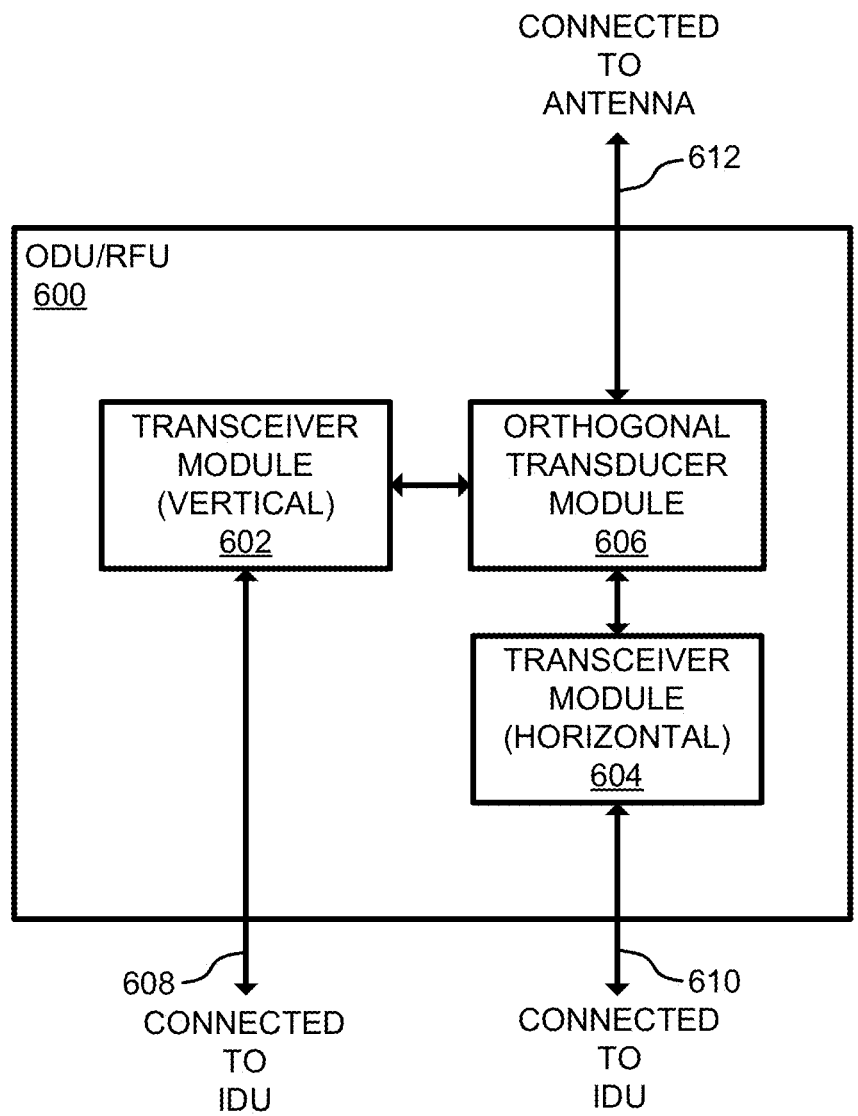
FIG. 6 is a block diagram illustrating an example of an outdoor-unit (ODU)/radio frequency unit (RFU) in accordance with some embodiments.

FIG. 6 is a block diagram illustrating an example of an outdoor-unit (ODU)/radio frequency unit (RFU) 600 in accordance with some embodiments. As illustrated, the outdoor unit (ODU)/radio frequency unit (RFU) 600 comprises a transceiver module 602 configured to handle the radio frequency (RF) path for a vertically polarized signal, a transceiver module 604 configured to handle the RF path for a horizontally polarized signal, and a orthogonal transducer module 606 configured to polarize and depolarize signals.

Each of the transceiver modules 602 and 604 is coupled to an IDU via either connection 608 or 610, which allows the transceivers to send and receive first and second data streams with the IDU. Each of the transceiver modules 602 and 604 is also coupled to the orthogonal transducer module 606 through the vertical polarization and horizontal polarization ports of the orthogonal transducer module 606. In some embodiments, these connections allow the transceivers to send non-polarized carrier signals to, and receive depolarized carrier signals from, the orthogonal transducer module 606. The orthogonal transducer module 606 is coupled to an antenna via connection 612, which allows the orthogonal transducer module 606 to transmit and receive polarized wireless signals using the antenna.

Figure 7:
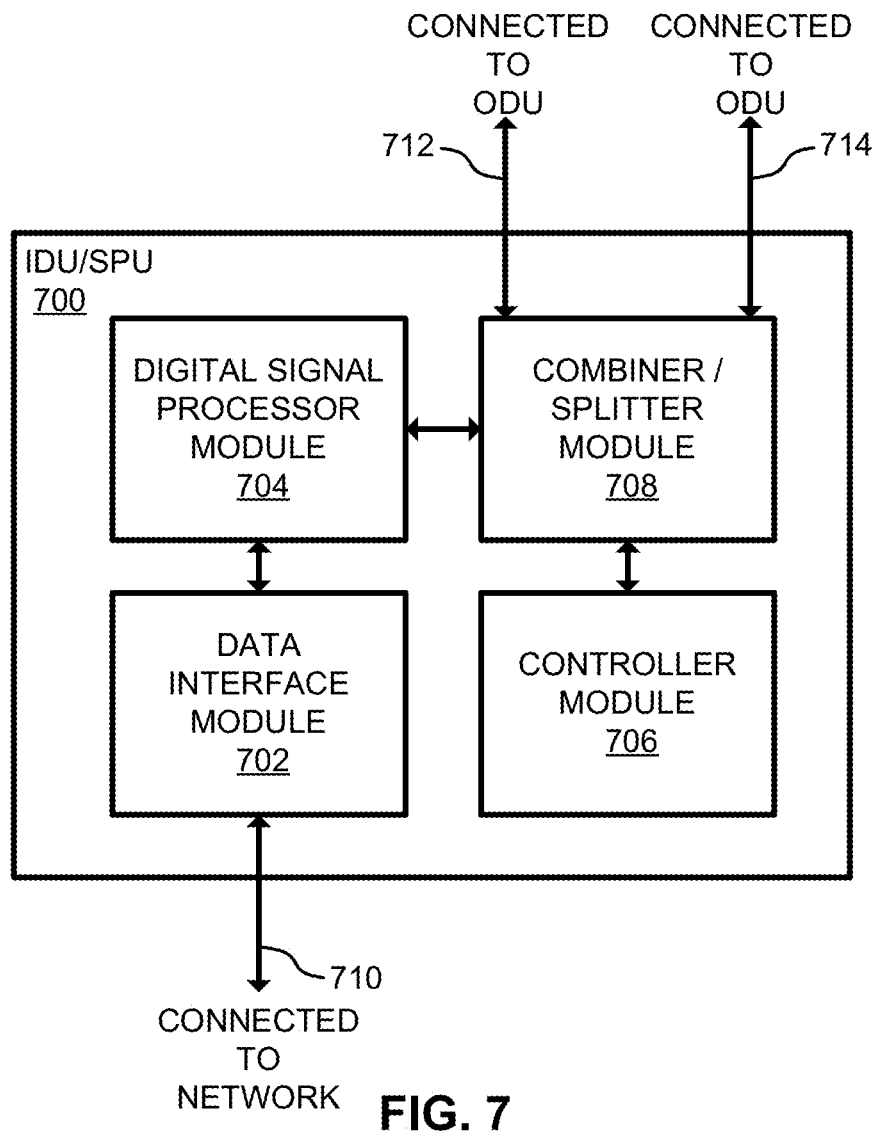
FIG. 7 is a block diagram illustrating an example of an indoor-unit (IDU)/signal processing unit (SPU) in accordance with some embodiments.

FIG. 7 is a block diagram illustrating an example of an indoor-unit (IDU)/signal processing unit (SPU) 700 in accordance with some embodiments. As shown, indoor unit (IDU)/signal processing unit (SPU) 700 comprises a data interface module 702, a digital signal processor module 704, and a combiner/splitter module 708 configured to combine and split data streams. The data interface module 702 is coupled to a data network via connection 710 and the digital signal processor module 704, and may be configured to convey data between the network and the digital signal processor module 704 via connection 710.

The digital signal processor module 704 is coupled to the data interface module 702 and the combiner/splitter module 708. According to some embodiments: when the microwave communications system is transmitting, the digital signal processor module 704 may be configured to convert data received from the data interface module 702 to a processed data stream, which is then provided to the combiner/splitter module 708. When the microwave communications system is receiving, the digital signal processor module 704 may be configured to convert a processed data stream received from the combiner/splitter module 708 to data, which is then provided to the data interface module 702.

The combiner/splitter module 708 is coupled to the digital signal processor module 704, an ODU, and a controller module 706. The controller module 706 may be configured to control operation of the combiner/splitter module 708 (e.g., how to split or combine data streams). In some embodiments, the combiner/splitter module 708 may be configured to split a data stream received from the digital signal processor module 704 into two data streams, which are then sent to an ODU via connections 712 and 714. In various embodiments, the combiner/splitter module 708 may be configured to combine a two data streams received from an ODU, via connections 712 and 714, into one data stream, and provide the one data stream to the digital signal processor module 704 for processing.

As used herein, the term set may refer to any collection of elements, whether finite or infinite. The term subset may refer to any collection of elements, wherein the elements are taken from a parent set; a subset may be the entire parent set.

As used herein, the term module might describe a given unit of functionality that can be performed in accordance with one or more embodiments. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of some embodiments are implemented in whole or in part using software, in some embodiments, these software elements can be implemented to operate with a digital device capable of carrying out the functionality described with respect thereto. An example of a digital device is shown in FIG. 8.

Figure 8:
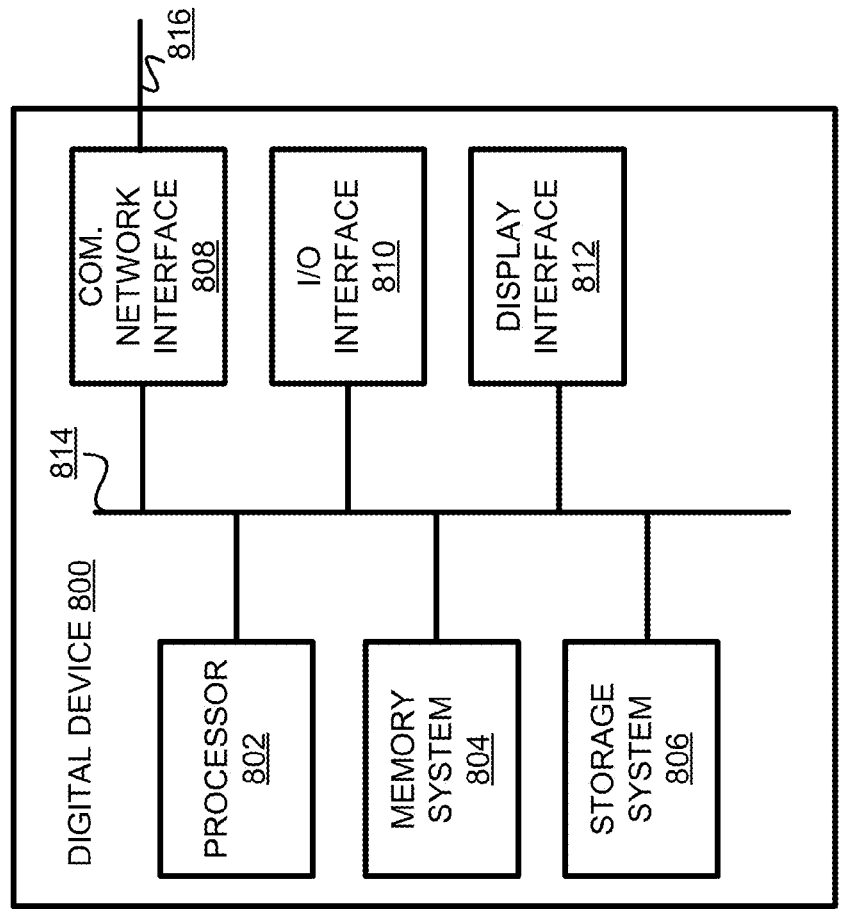
FIG. 8 is a block diagram illustrating an example digital device in accordance with some embodiments.

FIG. 8 is a block diagram of an exemplary digital device 800. The digital device 800 comprises a processor 802, a memory system 804, a storage system 806, a communication network interface 808, an I/O interface 810, and a display interface 812 communicatively coupled to a bus 814. The processor 802 may be configured to execute executable instructions (e.g., programs). In some embodiments, the processor 802 comprises circuitry or any processor capable of processing the executable instructions.

The memory system 804 is any memory configured to store data. Some examples of the memory system 804 are storage devices, such as RAM or ROM. The memory system 804 can comprise the ram cache. In various embodiments, data is stored within the memory system 804. The data within the memory system 804 may be cleared or ultimately transferred to the storage system 806.

The storage system 806 is any storage configured to retrieve and store data. Some examples of the storage system 806 are flash drives, hard drives, optical drives, and/or magnetic tape. In some embodiments, the digital device 800 includes a memory system 804 in the form of RAM and a storage system 806 in the form of flash data. Both the memory system 804 and the storage system 806 comprise computer readable media which may store instructions or programs that are executable by a computer processor including the processor 802.

The communication network interface (com. network interface) 808 can be coupled to a data network (e.g., data network 504 or 514) via the link 816. The communication network interface 808 may support communication over an Ethernet connection, a serial connection, a parallel connection, or an ATA connection, for example. The communication network interface 808 may also support wireless communication (e.g., 802.11 a/b/g/n, WiMax). It will be apparent to those skilled in the art that the communication network interface 808 can support many wired and wireless standards.

The optional input/output (I/O) interface 810 is any device that receives input from the user and output data. The optional display interface 812 is any device that may be configured to output graphics and data to a display. In one example, the display interface 812 is a graphics adapter.

It will be appreciated by those skilled in the art that the hardware elements of the digital device 800 are not limited to those depicted in FIG. 8. A digital device 800 may comprise more or less hardware elements than those depicted. Further, hardware elements may share functionality and still be within various embodiments described herein. In one example, encoding and/or decoding may be performed by the processor 802 and/or a co-processor located on a GPU.

Figure 9:
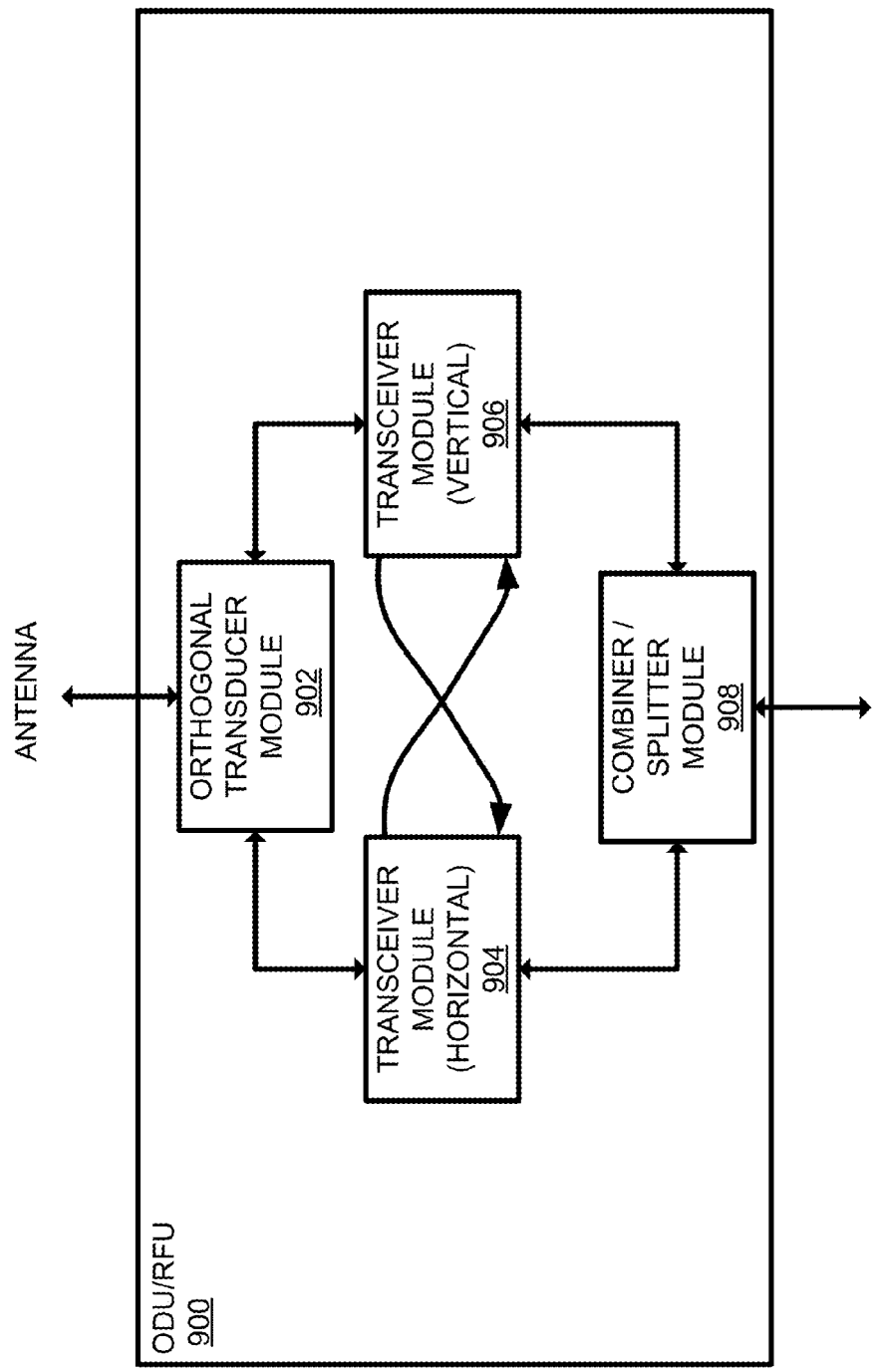
FIG. 9 is a block diagram illustrating an example of an outdoor-unit (ODU)/radio frequency unit (RFU) in accordance with some embodiments.

FIG. 9 is a block diagram illustrating an example of an outdoor-unit (ODU)/radio frequency unit (RFU) 900 in accordance with some embodiments. Upon receiving polarized signals from a remote antenna, a local antenna may provide the polarized signals to the orthogonal transducer module 902. The polarized signal from the remote antenna may be the same frequency (e.g., a similar center frequency). Unfortunately, atmospheric conditions and/or other variables may create crosstalk between the horizontal and vertical polarized signals.

The orthogonal transducer module 902 may depolarize the polarized signals to produce modulated carrier signals. The modulated carrier signal produced by depolarizing the received horizontally polarized signal may be provided to the horizontal transceiver module 904 handling the horizontal polarization RF path. Similarly, the modulated carrier signal produced by depolarizing the received vertically polarized signal may be provided to the vertical transceiver module 906 handling the vertical polarization RF path.

The horizontal transceiver module 904 may demodulate the received modulated carrier signal and provide the resulting data stream to the combiner/splitter module 908. Likewise, the vertical transceiver module 906 may demodulate the modulated carrier signal received from the orthogonal transducer module 902, and provide the resulting data stream to the combiner/splitter module 908.

The combiner/splitter module 908, in turn, may combine or concatenate the two data streams from the horizontal transceiver module 904 and the vertical transceiver module 906, respectively, to create a single data stream. For some embodiments, the combiner/splitter module 908 combines or concatenates the two data streams based on how the combiner/splitter module 908 at the transmitting site generated data streams from the original stream. Additionally, the combiner/splitter module 908 may perform operations in accordance with instructions provided by a control module 210 (e.g., control module 210 discussed regarding FIG. 2).

The combiner/splitter module 908 may provide the resulting single data stream to a digital signal processor (e.g., digital signal processor 224). Subsequent to processing the single data stream, the digital signal processor may provide resulting data to a data interface module.

Those skilled in the art will appreciate that there may be interference between the two polarized signals and/or other noise that occurs during transmission of the signals from the transmitting antenna to the receiving antenna. In some embodiments, the noise caused by the interference (e.g., residual noise from the horizontally polarized signal in the vertically polarized signal and residual noise from the vertically polarized signal in the horizontally polarized signal) may be cancelled or otherwise attenuated. The noise caused by the interference may be cancelled and/or attenuated by one or more components of the ODU 900 and/or the IDU.

In various embodiments, the two transceiver modules at a receiving site (e.g., two transceiver module of an ODU or IDU associated with a receiving antenna) cancel and/or attenuate interference noise. In one example, the horizontal transceiver module 904 receives a signal based on the vertically polarized signal (e.g., the depolarized modulated carrier signal based on the modulated carrier signal produced by depolarizing the vertically polarized signal) from the vertical transceiver module 906. The horizontal transceiver module 904 may utilize the signal from the vertical transceiver module 906 to cancel or attenuate the interference residual of the modulated carrier signal produced by depolarizing the horizontally polarized signal. Similarly, the vertical transceiver module 906 may receive a signal based on the horizontally polarized signal (e.g., the depolarized modulated carrier signal based on the modulated carrier signal produced by depolarizing the horizontally polarized signal) from the horizontal transceiver module 904. The vertical transceiver module 906 may utilize the signal from the horizontal transceiver module 904 to cancel or attenuate the interference residual of the modulated carrier signal produced by depolarizing the vertically polarized signal.

The signal based on the modulated carrier signal produced by depolarizing the vertically polarized signal provided from the vertical transceiver module 906 to the horizontal transceiver module 904 may be provided over a first cable. The signal based on the modulated carrier signal produced by depolarizing the horizontally polarized signal provided from the horizontal transceiver module 904 to the vertical transceiver module 906 may be provided over a second cable. The cables may be any kind of cables. In one example, the cables are coaxial cables. In some embodiments, the cables may be coupled between any two RF heads. In one example, the cables may each be coupled to ports on the horizontal transceiver module 904 and the vertical transceiver module 906.

The signal based on the modulated carrier signal produced by depolarizing the vertically polarized signal and the signal based on the modulated carrier signal produced by depolarizing the horizontally polarized signal may be at an intermediate frequency. For example, the ODU, IDU, or both, may convert the frequency of signals received by the receiving antenna to an intermediate frequency (e.g., by utilizing one or more down converters). Those skilled in the art will appreciate that the signal based on the modulated carrier signal produced by depolarizing the vertically polarized signal and the signal based on the modulated carrier signal produced by depolarizing the horizontally polarized signal may be at any frequency.

Further, although FIG. 9 depicts the horizontal transceiver module 904 and the vertical transceiver module 906 as being within the ODU/RFU 900, those skilled in the art will appreciate that the horizontal transceiver module 904 and/or the vertical transceiver module 906 may be within the ODU or IDU. Further, the horizontal transceiver module 904 and/or the vertical transceiver module 906 may be within any device even if the device is not a split mount system.

The noise caused by interference may be cancelled or attenuated in any number of ways. For example, the horizontal transceiver module 904 may comprise a processor or system on a chip that performs adaptive noise cancellation or noise attenuation on the modulated carrier signal produced by depolarizing the horizontally polarized signal. The processor or system on a chip may detect or otherwise cancel noise utilizing the signal based on the vertically polarized signal (e.g., signal based on the modulated carrier signal produced by depolarizing the vertically polarized signal). Those skilled in the art will appreciate that there may be any number of ways (e.g., separate passive and/or active components) to cancel or attenuate residual noise caused by cross polarization interference.

In some embodiments, the horizontal transceiver module 904 may configure settings of an equalization module to attenuate or cancel components of the modulated carrier signal and then perform equalization based on the settings. The settings may be based on the modulated carrier signal produced by depolarizing the vertically polarized signal from the vertical transceiver module 906. Similarly, the vertical transceiver module 906 may also configure settings of an equalization module to attenuate or cancel components of the modulated carrier signal from the orthogonal transducer module 902 and then perform equalization based on the settings. The settings of the vertical transceiver module 906's equalization module may be based on the modulated carrier signal produced by depolarizing the horizontally polarized signal from the horizontal transceiver module 904. Those skilled in the art will appreciate that there are many ways to cancel or attenuate residual noise caused by cross polarization interference utilizing signals associated with the noise to be cancelled or reduced.

In some embodiments, to utilize the system depicted in FIG. 9, a pair of cables and multiple ports are required. Multiple cables and multiple ports may add unnecessary cost. Further, during installation of an antenna, IDU, and/or ODU, workers may be required to bring extra cables and ports and install the extra equipment. If the receivers are a part of the ODU or are otherwise outside, the ports and/or cables may be weatherized to protect against the elements. Further, weather and other factors (e.g., connecting cables on a tower) may make installation of the multiple cables and ports outside difficult.

Figure 10:
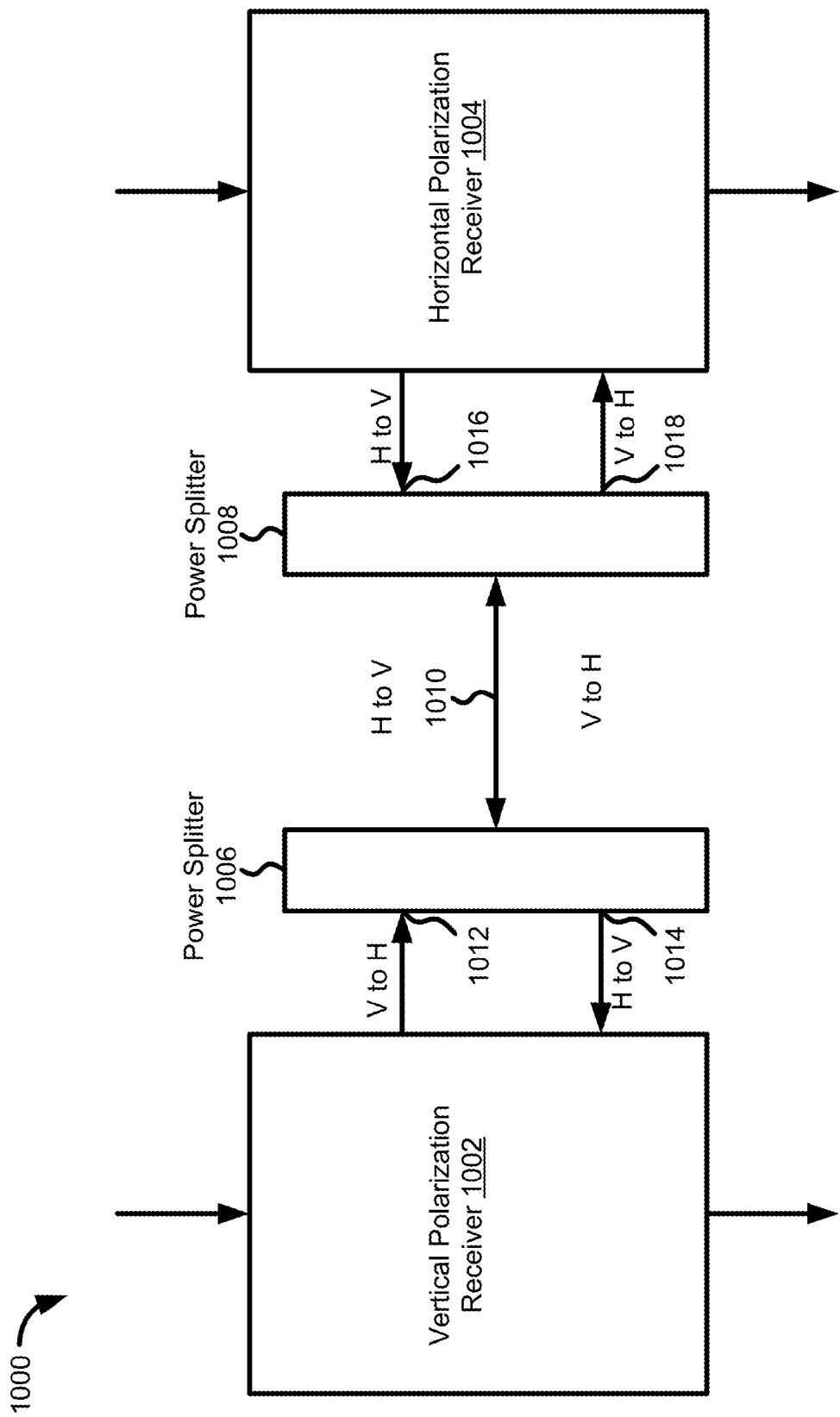
FIG. 10 is a block diagram of a vertical polarization receiver and a horizontal polarization receiver configured to cancel noise caused by cross polarization interference utilizing a single cable in some embodiments.

FIG. 10 is a block diagram 1000 of a vertical polarization receiver 1002 and a horizontal polarization receiver 1004 configured to cancel noise caused by cross polarization interference utilizing a single cable 1010 in some embodiments. The block diagram 1000 comprises a vertical polarization receiver 1002, a horizontal polarization receiver 1004, power splitters 1006 and 1008, and cable 1010.

The vertical polarization receiver 1002 and the horizontal polarization receiver 1004 may be any receivers configured to demodulate a carrier signal and/or process a signal. In some embodiments, the vertical polarization receiver 1002 may demodulate a modulated carrier signal received from an orthogonal transducer module and provide the resulting data stream to a combiner/splitter. Likewise, the horizontal polarization receiver 1004 may demodulate the modulated carrier signal received from the orthogonal transducer module, and provide the resulting data stream to the combiner/splitter. In some embodiments, the vertical polarization receiver 1002 may be or may comprise an orthogonal transducer module (e.g., the orthogonal transducer module 902 in FIG. 9). In some embodiments, the horizontal polarization receiver 1004 may be or may comprise an orthogonal transducer module (e.g., the orthogonal transducer module 904 in FIG. 9).

The power splitters 1006 and 1008 may be any coupler, summer, power summer, or power splitter. In some embodiments, the power splitter 1006 is a reactive power splitter that allows for at least some isolation between two inputs 1012 and 1014 coupled to the vertical polarization receiver 1002. In one example, the power splitter 1006 provides for a 20-25 dB loss between the input 1012 and the input 1014. For example, any leakage of the V to H signal that may reach the input 1014 may be reduced by 25 dB. Those skilled in the art will appreciate that there may be any degree of attenuation, dB loss, and/or isolation between two inputs of the power splitters. In some embodiments, the power splitter 1006 and 1008 are each transformers with a center tap and a resistor between windings.

In various embodiments, the power splitter 1008 is a reactive power splitter that allows for at least some isolation between two inputs 1016 and 1018 coupled to the horizontal polarization receiver 1004. In one example, the power splitter 1008 provides for a 20-25 dB loss between the input 1016 and the input 1018. For example, any leakage of the V to H signal that may reach the input 1018 may be reduced by 25 dB. Those skilled in the art will appreciate that there may be any degree of attenuation, dB loss, and/or isolation between two inputs of the power splitters.

The power splitters 1006 and 1008 may be coupled to the vertical polarization receiver 1002 and horizontal polarization receiver 1004, respectively, over contacts. In some embodiments, the splitters 1006 and 1008 may be coupled to the vertical polarization receiver 1002 and horizontal polarization receiver 1004 utilizing cables.

In some embodiments, the power splitters 1006 and 1008 may be any router. The power splitters 1006 and 1008 may be resistive power splitters. In one example, the power splitters 1006 and 1008 may be resistive power splitters with matched impedance and/or isolation between two or more inputs 1012 and 1014 and/or 1016 and 1018 (e.g., increased isolation between inputs of the power splitter that are coupled to a receiver). In various embodiments, impedance is matched on all ports and inputs of a power splitter. For example impedance of inputs 1012 and 1016 as well as the interface with the cable 1010 (e.g., a port).

In various embodiments, the vertical polarization receiver 1002 cancels or otherwise attenuates interference (e.g., cross polarization interference) caused by the horizontally polarized signal. The vertical polarization receiver 1002 may receive a first modulated carrier signal from the orthogonal transducer module and may receive the second modulated carrier signal from the horizontal polarization receiver 1004 via the power splitter 1006, power splitter 1008, and the cable 1010. The vertical polarization receiver 1002 may cancel or attenuate the interference within the first modulated carrier signal caused by the horizontally polarized signal by utilizing the second modulated carrier signal to generate a clean signal. In various embodiments, the vertical polarization receiver 1002 comprises a PVG 610 system on a chip capable of cancellation and/or attenuation based on a received signal. The cleaned signal may be provided to a combiner module (e.g., combiner/splitter module 908).

Similarly, in some embodiments, the horizontal polarization receiver 1004 cancels or otherwise attenuates interference caused by the vertically polarized signal. The horizontal polarization receiver 1004 may receive a first modulated carrier signal from the orthogonal transducer module and may receive the second modulated carrier signal from the vertical polarization receiver 1002 via the power splitter 1006, power splitter 1008, and the cable 1010. The horizontal polarization receiver 1004 may cancel or attenuate the interference within the first modulated carrier signal caused by the horizontally polarized signal by utilizing the second modulated carrier signal to generate a clean signal. The cleaned signal may be provided to the combiner module (e.g., combiner/splitter module 908).

The cable 1010 may be any cable including, for example, a coaxial cable.

Figure 11:
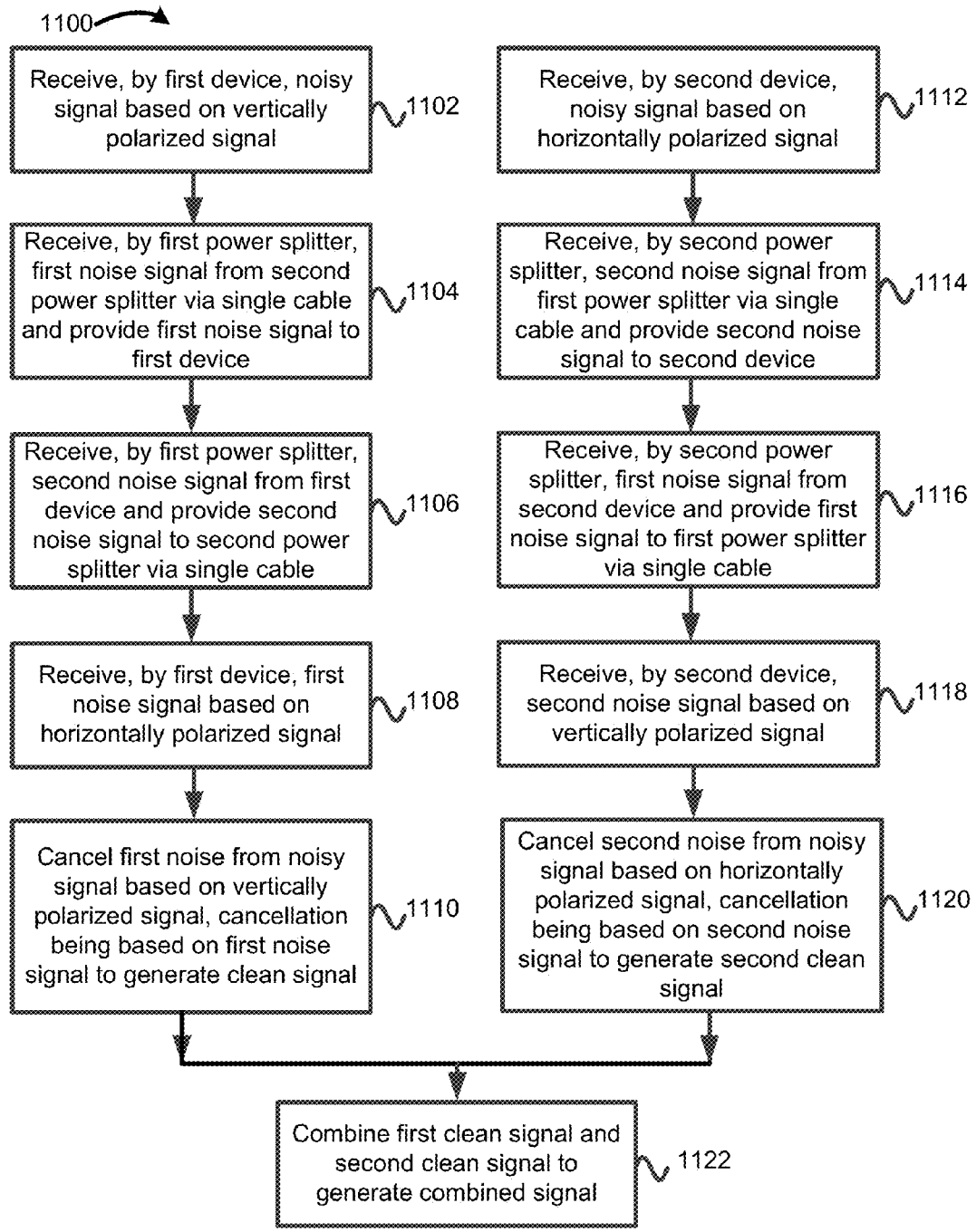
FIG. 11 is a method for cancelling noise within a noisy signal based on a vertically polarized signal and cancelling noise within a noisy signal based on a horizontally polarized signal in some embodiments.

FIG. 11 is a method for cancelling noise within a noisy signal based on a vertically polarized signal and cancelling noise within a noisy signal based on a horizontally polarized signal in some embodiments. Steps 1102-1110 may operate simultaneously or near simultaneously with steps 1112-1120. The steps 1102-1120 may be in any order (e.g., all or some steps of 1102-1110 may occur before or after any or all of the steps of 1112-1120).

In step 1102, a first device 1002, such as a transceiver or receiver, may receive a noisy signal based on a vertically polarized signal. In one example, the vertically polarized signal and a horizontally polarized signal with the same or similar frequencies may be received by an antenna. The polarized signals may be depolarized and provided to the first and second devices, respectively. The modulated signal (e.g., noisy signal) based on the vertically polarized signal may include noise (e.g., interference) caused by cross polarization of the horizontally polarized signal. Similarly, the modulated signal (e.g., noisy signal) based on the horizontally polarized signal may include noise caused by cross polarization of the vertically polarized signal.

In some embodiments, the modulated signal based on the horizontally polarized signal may be used to adaptively cancel the interference from the vertically polarized signal caused by the horizontally polarized signal. In one example, the first device 1002 may adaptively cancel or attenuate noise of the modulated signal based on the horizontally polarized signal utilizing the modulated signal based on the vertically polarized signal.

Similarly, the modulated signal based on the vertically polarized signal may be used to adaptively cancel the interference from the horizontally polarized signal caused by the vertically polarized signal. In one example, the second device may adaptively cancel or attenuate noise of the modulated signal based on the vertically polarized signal utilizing the modulated signal based on the horizontally polarized signal.

In step 1104, a first power splitter 1006 receives a first noise signal from a second power splitter 1008 via a single cable 1010. The first power splitter 1006 provides the first noise signal to the first device 1002. The first power splitter 1006 may be coupled to a second power splitter 1008 by the single cable 1010. The first noise signal may be based or a modulated signal (e.g., the modulated signal based on the horizontally polarized signal).

In step 1106, the first power splitter 1006 receives a second noise signal from the first device 1002 and provides the first noise signal to the second power splitter 1008 via a single cable 1010. The second noise signal may be based or a modulated signal (e.g., the modulated signal based on the vertically polarized signal). The second noise signal may be utilized to cancel or attenuate noise from a signal (e.g., a noisy signal based on the horizontally polarized signal).

In step 1108, the first device 1002 receives the first noise signal based on the horizontally polarized signal from the first power splitter 1006. In step 1110, the first device 1002 cancels or attenuates first noise from the noisy signal based on the vertically polarized signal by utilizing the first noise signal received from the first power splitter 1006. In some embodiments, the first device 1002 adaptively cancels energy within the noisy signal caused by interference. In various embodiments, the first device 1002 attenuates the energy within the noisy signal caused by interference.

In some embodiments, while any or all steps 1102-1110 occur, any or all steps 1112-1120 may be performed. In step 1112, a second device 1004, such as a transceiver or receiver, may receive a noisy signal based on a horizontally polarized signal.

In step 1114, a second power splitter 1008 receives the second noise signal from the first power splitter 1006 via the single cable 1010. The second power splitter 1008 provides the second noise signal to the second device 1004. The second noise signal may be based or a modulated signal (e.g., the modulated signal based on the vertically polarized signal).

In step 1116, the second power splitter 1008 receives a first noise signal from the second device 1004 and provides the first noise signal to the first power splitter 1006 via the single cable 1010. The first noise signal may be based or a modulated signal (e.g., the modulated signal based on the horizontally polarized signal).

In step 1118, the second device 1004 receives the second noise signal based on the vertically polarized signal from the second power splitter 1008. In step 1120, the second device 1004 cancels or attenuates second noise from the noisy signal based on the horizontally polarized signal by utilizing the second noise signal received from the second power splitter 1008. In some embodiments, the second device 1004 adaptively cancels energy within the noisy signal caused by interference. In various embodiments, the second device 1004 attenuates the energy within the noisy signal caused by interference.

In step 1122, a combiner may combine the first clean signal and the second clean signal to generate a combined signal. The combined signal may be provided to an interface that leads to an IDU or digital device.

Figure 12:
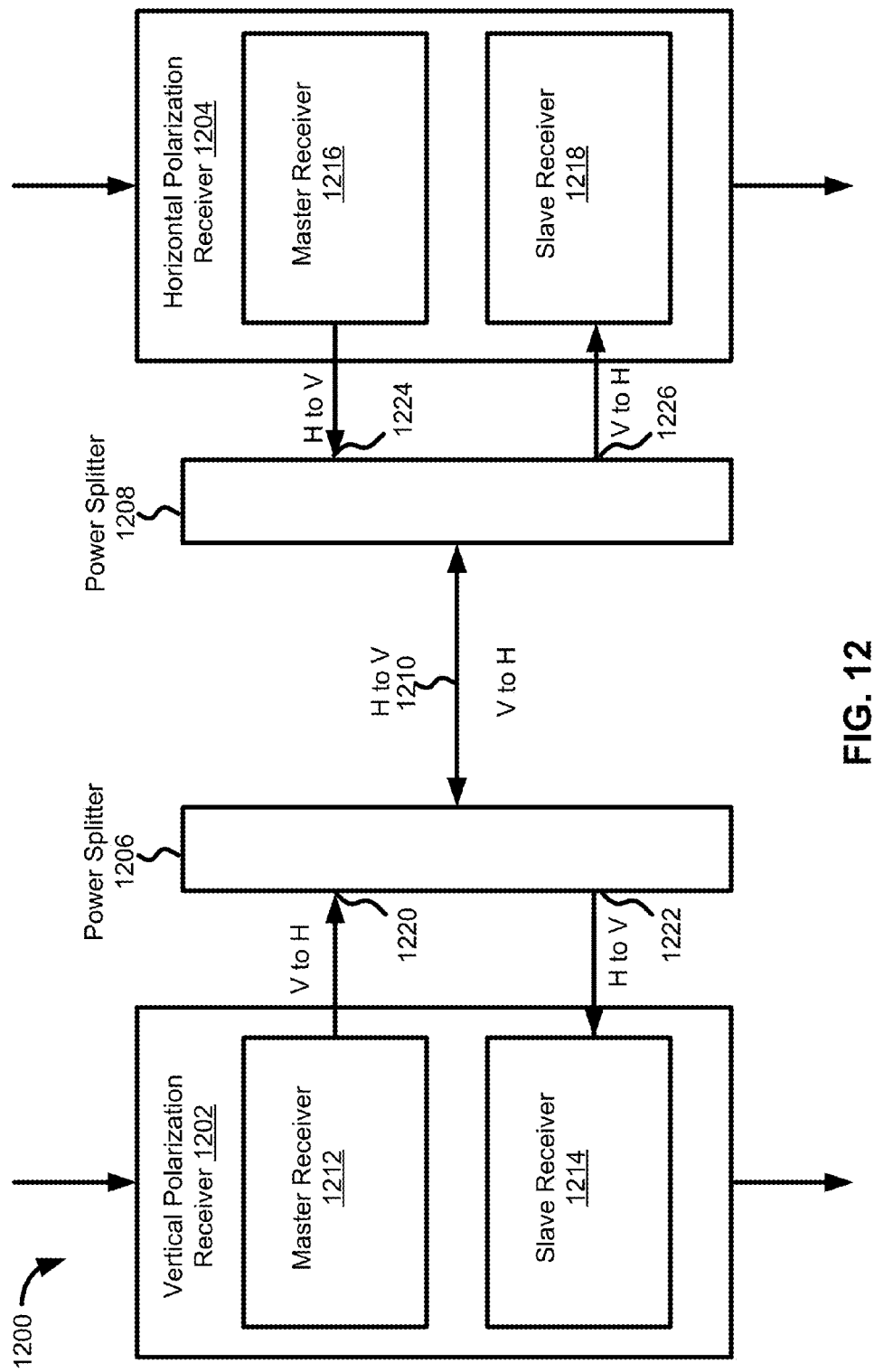
FIG. 12 is a block diagram of a vertical polarization receiver and a horizontal polarization receiver configured to cancel noise caused by cross polarization interference utilizing a single cable in some embodiments.

FIG. 12 is a block diagram 1200 of a vertical polarization receiver 1202 and a horizontal polarization receiver 1204 configured to cancel noise caused by cross polarization interference utilizing a single cable 1210 in some embodiments. The block diagram 1200 comprises a vertical polarization receiver 1202, a horizontal polarization receiver 1204, power splitters 1206 and 1208, and cable 1210. The vertical polarization receiver 1202 comprises a master receiver 1212 and a slave receiver 1214. The horizontal polarization receiver 1204 comprises a master receiver 1216 and a slave receiver 1218.

As discussed regarding the vertical polarization receiver 1002 and the horizontal polarization receiver 1004, the vertical polarization receiver 1202 and the horizontal polarization receiver 1204 may be any receivers configured to demodulate a carrier signal and/or process a signal. In some embodiments, the vertical polarization receiver 1202 may demodulate a modulated carrier signal received from an orthogonal transducer module and provide the resulting data stream to a combiner/splitter. Likewise, the horizontal polarization receiver 1204 may demodulate the modulated carrier signal received from the orthogonal transducer module, and provide the resulting data stream to the combiner/splitter.

In various embodiments, the master receiver 1212 and the slave receiver 1214 comprise the same type of hardware or software. In one example, the master receiver 1212 and the slave receiver 1214 both include a system on a chip (e.g., PVG610). In some embodiments, the master receiver 1212 and the slave receiver 1214 comprise hardware configured to perform adaptive cancellation and/or attenuation. Those skilled in the art will appreciate that the master receiver 1212 and the slave receiver 1214 may not include the same kind of hardware and/or software.

In various embodiments, the master receiver 1212 and the slave receiver 1214 each comprise an equalizer, adaptive cancellation module, and/or other attenuation component. The slave receiver 1214 may cancel or attenuate the first noise signal utilizing the equalizer, adaptive cancellation module, and/or other attenuation component to generate a filtered signal. The slave receiver 1214 may provide settings of the equalizer, adaptive cancellation module, and/or other attenuation component to the master receiver 1212. The master receiver 1212 may utilize the settings to configure the equalizer, adaptive cancellation module, and/or other attenuation component of the master receiver 1212. The master receiver 1212 may cancel or attenuate noise from the noisy signal based on the vertically polarized signal utilizing the configured equalizer, adaptive cancellation module, and/or other attenuation component. The noisy signal based on the vertically polarized signal may be a modulated carrier signal produced by depolarizing the received vertically polarized signal. The modulated carrier signal may include at least some noise caused by cross polarization interference.

The slave receiver 1214 may be configured to receive the first noise signal from the horizontal polarization receiver 1204. The first noise signal may be a sample or other signal based on the modulated horizontally polarized signal. In various embodiments, the horizontal polarization receiver 1204 samples the modulated signal based on the horizontally polarized signal and provides the sampled signal as the first noise signal to the vertical polarization receiver 1202 via the single cable 1210 and the two power receivers 1206 and 1208.

The first power splitter 1206 may receive the first noise signal from the second power splitter 1208 via the single cable 1210 and provide the signal to the vertical polarization receiver 1202. In some embodiments, the vertical polarization receiver 1202 is coupled to the first power splitter 1206 by two inputs 1220 and 1222. Input 1220 may couple the first power splitter 1206 to the master receiver 1212. Input 1222 may couple the first power splitter 1206 to the slave receiver 1214. The first power splitter 1206 may provide the first noise signal to both inputs 1220 and 1222. In one example, the first power splitter 1206 may provide half of the first noise signal to the master receiver 1212 and half of the first noise signal to the slave receiver 1214.

Since the master receiver 1212 may not be configured to receive signals from the first power splitter 1206, any signal received from the first power splitter 1206 may be attenuated due to impedance (e.g., the master receiver 1212 may operate as a 50 Ohm source or as a source of any impedance).

In some embodiments, the slave receiver 1214 may be configured to receive the first noise signal from the first power splitter 1206. In some embodiments, the slave receiver 1214 receives and analyzes the first noise signal. In one example, the slave receiver 1214 may provide the master receiver 1212 with equalization settings, attenuation settings, and/or cancellation settings. The master receiver 1212 may utilize the settings to cancel or attenuate noise (e.g., interference) from the modulated signal based on the vertically polarized signal caused by cross polarization interference.

The slave receiver 1214 may provide the noise signal and/or a filtered signal to the master receiver 1212. In some embodiments, the slave receiver 1214 cancels or attenuates all or part of the noise signal to generate the filtered signal. The filtered signal may then be provided to the master receiver 1212.

In some embodiments, the master receiver 1212 may compare the modulated signal based on the vertically polarized signal to the noise signal and/or filtered signal received from the slave receiver 1214. In various embodiments, the master receiver 1212 cancels and/or attenuates noise based on settings received from the slave receiver 1212 to generate the first clean signal. The master receiver 1212 may compare the first clean signal to the noise signal and/or the filtered signal and generate an error signal. The error signal may be correlated with leakage (e.g., remaining noise from cross polarization). The error signal may be provided by the master receiver 1212 to the slave receiver 1214. The slave receiver 1214 may utilize the error signal (e.g., attempt to minimize the error) from the master receiver 1212 to generate updated settings. For example, the slave receiver 1214 may utilize the error signal to change cancellation or equalization of the received first noise signal. In a further example, the slave receiver 1214 may utilize the error signal from the master receiver 1212 to configure taps of an equalizer to adaptively cancel all or parts of the first signal. Updated settings based, at least in part, on the error signal may then be provided to the master receiver 1212. The master receiver 1212 may utilize the updated settings to attenuate or cancel noise from the noisy signal based on the vertically polarized signal.

In various embodiments, there may be leakage between the input ports 1220 and 1222 of the first power splitter 1206 (e.g., the input ports coupling the first power splitter 1206 to the vertical polarization receiver 1202). Those skilled in the art will appreciate that any leakage of the second signal (e.g., a sample signal based on the modulated signal of the vertically polarized signal) may be attenuated by the input port isolation as discussed herein. Further, the slave receiver 1214 and/or the master receiver 1212 may cancel or attenuate at least some of the remaining energy associated with the leakage.

In various embodiments, the master receiver 1216 and the slave receiver 1218 comprise the same type of hardware or software. In one example, the master receiver 1216 and the slave receiver 1218 both include a system on a chip (e.g., PVG610). In some embodiments, the master receiver 1216 and the slave receiver 1218 comprise hardware configured to perform adaptive cancellation and/or attenuation. Those skilled in the art will appreciate that the master receiver 1216 and the slave receiver 1218 may not include the same kind of hardware and/or software.

In various embodiments, as discussed regarding the master receiver 1212 and the slave receiver 1214, the master receiver 1216 and the slave receiver 1218 may each comprise an equalizer, adaptive cancellation module, and/or other attenuation component. The slave receiver 1218 may cancel or attenuate the second noise signal utilizing the equalizer, adaptive cancellation module, and/or other attenuation component to generate a filtered signal. The slave receiver 1218 may provide settings of the equalizer, adaptive cancellation module, and/or other attenuation component to the master receiver 1216. The master receiver 1216 may utilize the settings to configure the equalizer, adaptive cancellation module, and/or other attenuation component of the master receiver 1216. The master receiver 1216 may cancel or attenuate noise from the noisy signal based on the horizontally polarized signal utilizing the configured equalizer, adaptive cancellation module, and/or other attenuation component. The noisy signal based on the horizontally polarized signal may be a modulated carrier signal produced by depolarizing the received horizontally polarized signal. The modulated carrier signal may include at least some noise caused by cross polarization interference.

The slave receiver 1218 may be configured to receive the second noise signal from the vertical polarization receiver 1202. The second noise signal may be a sample or other signal based on the modulated vertically polarized signal. In various embodiments, the vertical polarization receiver 1202 samples the modulated signal based on the vertically polarized signal and provides the sampled signal as the second noise signal to the horizontal polarization receiver 1204 via the single cable 1210 and the two power receivers 1206 and 1208.

The second power splitter 1208 may receive the second noise signal from the first power splitter 1206 via the single cable 1210 and provide the signal to the horizontal polarization receiver 1204. In some embodiments, the horizontal polarization receiver 1204 is coupled to the second power splitter 1208 by inputs 1224 and 1226. Input 1224 may couple the second power splitter 1208 to the master receiver 1216. Input 1226 may couple the second power splitter 1208 to the slave receiver 1218. The second power splitter 1208 may provide the second noise signal to both inputs 1224 and 126. In one example, the second power splitter 1208 may provide half of the second noise signal to the master receiver 1216 and half of the second noise signal to the slave receiver 1218.

Since the master receiver 1216 may not be configured to receive signals from the second power splitter 1208, any signal received from the second power splitter 1208 may be attenuated due to impedance (e.g., the master receiver 1216 may operate as a 50 Ohm source or as a source of any impedance).

In some embodiments, the slave receiver 1218 may be configured to receive the second noise signal from the second power splitter 1208. In some embodiments, the slave receiver 1218 receives and analyzes the second noise signal. In one example, the slave receiver 1218 may provide the master receiver 1216 with equalization settings, attenuation settings, and/or cancellation settings. The master receiver 1216 may utilize the settings to cancel or attenuate noise (e.g., interference) from the modulated signal based on the horizontally polarized signal caused by cross polarization interference.

The slave receiver 1218 may provide the noise signal and/or a filtered signal to the master receiver 1216. In some embodiments, the slave receiver 1216 cancels or attenuates all or part of the noise signal to generate the filtered signal. The filtered signal may then be provided to the master receiver 1216.

In some embodiments, the master receiver 1216 may compare the modulated signal based on the horizontally polarized signal to the noise signal and/or filtered signal received from the slave receiver 1218. In various embodiments, the master receiver 1216 cancels and/or attenuates noise based on settings received from the slave receiver 1218 to generate the second clean signal. The master receiver 1216 may compare the second clean signal to the noise signal and/or the filtered signal and generate an error signal. The error signal may be correlated with leakage (e.g., remaining noise from cross polarization). The error signal may be provided by the master receiver 1216 to the slave receiver 1218. The slave receiver 1218 may utilize the error signal (e.g., attempt to minimize the error) from the master receiver 1216 to generate updated settings. For example, the slave receiver 1218 may utilize the error signal to change cancellation or equalization of the received first noise signal. In a further example, the slave receiver 1218 may utilize the error signal from the master receiver 1216 to configure taps of an equalizer to adaptively cancel all or parts of the second signal. Updated settings based, at least in part, on the error signal may then be provided to the master receiver 1216. The master receiver 1216 may utilize the updated settings to attenuate or cancel noise from the noisy signal based on the horizontally polarized signal.

In various embodiments, there may be leakage between the input ports 1224 and 1226 of the second power splitter 1208 (e.g., the input ports 1224 and 1226 coupling the second power splitter 1208 to the horizontal polarization receiver 1204). Those skilled in the art will appreciate that any leakage of the first signal (e.g., a sample signal based on the modulated signal of the horizontally polarized signal) may be attenuated by the input port isolation as discussed herein. Further, the slave receiver 1218 and/or the master receiver 1216 may cancel or attenuate at least some of the remaining energy associated with the leakage.

The cleaned signals may be provided to the combiner module (e.g., combiner/splitter module 908).

The power splitter 1206 and 1208 may be similar to power splitters 1106 and 1108. The power splitter 1206 may receive the first signal from the master receiver 1212 and provide the first signal to the slave receiver 1218 of the horizontal polarization receiver 1204 via the single cable 1210 and the power splitter 1208. Similarly, the power splitter 1208 may receive the second signal from the master receiver 1216 and provide the second signal to the slave receiver 1214 of the horizontal polarization receiver 1202 via the single cable 1210 and the power splitter 1206.

The cable 1210 may be any cable including, for example, a coaxial cable.

Those skilled in the art will appreciate that impedance may be matched on ports associated with the first power splitter 1206 and ports associated with the second power splitter 1208. For example, the power splitter 1206 may be terminated with impedance (e.g., 50 ohms). The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

What is claimed is:

1. A system comprising:
a first device configured to receive a vertically polarized signal and a first noise component generated from a horizontally polarized signal, and to provide a first adaptive cancellation of a portion of vertically polarized noise in the vertically polarized signal, the first adaptive cancellation being based on the first noise component, and the first adaptive cancellation generating a first adaptively canceled signal;
a second device configured to receive the horizontally polarized signal and a second noise component generated from the vertically polarized signal, and to generate a second adaptive cancellation of a portion of horizontally polarized noise in the horizontally polarized signal, the second adaptive cancellation being based on the second noise component, and the second adaptive cancellation generating a second adaptively canceled signal;
a single cable coupled to the first device and to the second device, the single cable adapted to facilitate transmission of the second noise component from the second device to the first device, and adapted to facilitate transmission of the first noise component from the first device to the second device.

2. The system of claim 1 further comprising a first power splitter coupled to the first device and to the single cable, the first power splitter configured to provide the first noise component to the first device over a first port and the first power splitter configured to receive the second noise component from the first device over a second port, the first port being at least partially isolated from the second port.

3. The system of claim 1 further comprising a first power splitter coupled to the first device and to the single cable, and a second power splitter coupled to the second device, one or more of the first power splitter and the second power splitter comprising a reactive power splitter.

4. The system of claim 1 wherein one or more of the first device and the second device comprises a receiver coupled to an antenna configured to receive the signal.

5. The system of claim 1 wherein the first device is configured to equalize the vertically polarized noise based at least partially on the second noise component to attenuate at least some of the portion of the vertically polarized noise.

6. The system of claim 1 wherein the first device is configured to attenuate at least some of the vertically polarized noise based at least partially on the first noise component.

7. The system of claim 1 wherein one or more of the vertically polarized noise and the horizontally polarized noise results from cross polarization interference.

8. The system of claim 1 further comprising a combiner coupled to the first device, the combiner configured to generate a combined signal based on the first adaptively canceled signal and the second adaptively canceled signal.

9. The system of claim 1 further comprising an orthogonal transducer coupled to an antenna, to the first device, and to the second device, the orthogonal transducer configured to: receive the vertically polarized signal and the horizontally polarized signal, provide the vertically polarized signal to the first device, and provide the horizontally polarized signal to the second device.

10. The system of claim 9 further comprising a waveguide filter configured to filter the vertically polarized signal and the horizontally polarized signal from the antenna and provide the filtered vertically polarized signal and the filtered horizontally polarized signal to the orthogonal transducer.

11. A method comprising:
receiving, by a first device, a vertically polarized signal;
receiving, by the first device, a first noise component generated from a horizontally polarized signal, the first device receiving the first noise component through a single cable;
providing a first adaptive cancellation, by the first device, of a portion of vertically polarized noise from the vertically polarized signal, the adaptive cancellation being based on the first noise component, and the first adaptive cancellation generating a first adaptively canceled signal;

receiving, by a second device, a second noise component generated from the vertically polarized signal, the second device receiving the second noise component through the single cable;

receiving, by the second device, the horizontally polarized signal;

providing a second adaptive cancellation, by the second device, of a portion of the horizontally polarized signal, the second adaptive cancellation being based on the second noise component, and the second adaptive cancellation generating a second adaptively canceled signal.

12. The method of claim 11 further comprising providing, using a first power splitter, the first noise component to the first device over a first port, and receiving, using the first power splitter, the second noise component from the first device over a second port, the first port being at least partially isolated from the second port.

13. The method of claim 12 wherein the first power splitter comprises a reactive power splitter.

14. The method of claim 11 wherein one or more of the first device and the second device comprises a receiver.

15. The method of claim 11 wherein the first adaptive cancellation comprises equalizing the vertically polarized noise based at least partially on the second noise component to attenuate at least some of the portion of the vertically polarized noise.

16. The method of claim 11 wherein the first device is configured to attenuate at least some of the vertically polarized noise based at least partially on the first noise component.

17. The method of claim 11 wherein one or more of the vertically polarized noise and the horizontally polarized noise results from cross polarization interference.

18. The method of claim 11 further comprising: generating a combined signal based on the first adaptively canceled signal and the second adaptively canceled signal.

19. The method of claim 11 further comprising:
receiving, by an orthogonal transducer, the vertically polarized signal and the horizontally polarized signal;
providing the vertically polarized signal to the first device; and
providing the horizontally polarized signal to the second device.

20. The method of claim 19 further comprising:
filtering, by a waveguide filter, the vertically polarized signal and the horizontally polarized signal from the antenna; and
providing the filtered vertically polarized signal and the filtered horizontally polarized signal to the orthogonal transducer.

21. A system comprising:
a first transceiver means configured to receive a vertically polarized signal and a first noise component generated from a horizontally polarized signal, and to provide a first adaptive cancellation of a portion of vertically polarized noise in the vertically polarized signal, the first adaptive cancellation being based on the first noise component, and the first adaptive cancellation generating a first adaptively canceled signal;
a second transceiver means configured to receive the horizontally polarized signal and a second noise component generated from the vertically polarized signal, and to generate a second adaptive cancellation of a portion of horizontally polarized noise in the horizontally polarized signal, the second adaptive cancellation being based on the second noise component, and the second adaptive cancellation generating a second adaptively canceled signal;
a single cable coupled to the first transceiver means and to the second transceiver means, the single cable adapted to facilitate transmission of the second noise component from the second transceiver means to the first transceiver means, and adapted to facilitate transmission of the first noise component from the first transceiver means to the second transceiver means.

* * * * *